US010153895B2

(12) United States Patent
Payton et al.

(10) Patent No.: US 10,153,895 B2
(45) Date of Patent: *Dec. 11, 2018

(54) HOMOMORPHIC DATABASE OPERATIONS APPARATUSES, METHODS AND SYSTEMS

(71) Applicant: Visa International Service Association, San Francisco, CA (US)

(72) Inventors: Paul Payton, San Carlos, CA (US); Scott Edington, Arlington, VA (US); Johan Van Tilburg, Bluffton, SC (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/868,736

(22) Filed: Jan. 11, 2018

(65) Prior Publication Data

US 2018/0131507 A1    May 10, 2018

Related U.S. Application Data

(63) Continuation of application No. 15/628,383, filed on Jun. 20, 2017, now Pat. No. 9,912,472, which is a continuation of application No. 14/449,706, filed on Aug. 1, 2014, now Pat. No. 9,722,777.

(60) Provisional application No. 61/861,368, filed on Aug. 1, 2013.

(51) Int. Cl.
*G06F 21/00* (2013.01)
*H04L 9/00* (2006.01)
*H04L 9/14* (2006.01)

(52) U.S. Cl.
CPC .............. *H04L 9/008* (2013.01); *H04L 9/14* (2013.01)

(58) Field of Classification Search
CPC .................................. H04L 9/14; H04L 9/008
See application file for complete search history.

(56) References Cited

U.S. PATENT DOCUMENTS

| 7,500,111 | B2 * | 3/2009 | Hacigumus | ....... G06F 17/30471 |
| | | | | 380/279 |
| 8,402,555 | B2 | 3/2013 | Grecia | |
| 8,533,860 | B1 | 9/2013 | Grecia | |
| 8,887,308 | B2 | 11/2014 | Grecia | |
| 9,275,249 | B1 * | 3/2016 | Allen | .................. G06F 21/6227 |
| 2002/0007347 | A1 | 1/2002 | Blumenthal | |
| 2006/0085651 | A1 * | 4/2006 | Staddon | .............. G06F 21/6227 |
| | | | | 713/193 |

(Continued)

OTHER PUBLICATIONS

Raluca Ada Popa, Catherine M.S. Redfield, Nickolai Zeldovich, and Hari Balakrishnan; CryptDB: Processing Queries on an Encrypted Database, Sep. 2012, vol. 55; pp. 103-111.

(Continued)

*Primary Examiner* — Ghodrat Jamshidi
(74) *Attorney, Agent, or Firm* — Loeb & Loeb LLP

(57) ABSTRACT

The HOMOMORPHIC DATABASE OPERATIONS APPARATUSES, METHODS AND SYSTEMS ("HEDO") transform transaction storage requests and homomorphic model queries using HEDO components into homomorphic model query results. In some implementations, the disclosure provides a processor-implemented method of securely querying a shared homomorphically encrypted data repository and performing cross-table homomorphic joins.

20 Claims, 19 Drawing Sheets

(56) References Cited

U.S. PATENT DOCUMENTS

| | | | |
|---|---|---|---|
| 2008/0300641 A1 | 12/2008 | Brunekreeft | |
| 2012/0310916 A1 | 12/2012 | Abadi | |
| 2013/0010950 A1* | 1/2013 | Kerschbaum | H04L 9/008 |
| | | | 380/30 |
| 2013/0191650 A1* | 7/2013 | Balakrishnan | G06F 21/6227 |
| | | | 713/190 |
| 2015/0039586 A1* | 2/2015 | Kerschbaum | G06F 17/30463 |
| | | | 707/718 |

OTHER PUBLICATIONS

Popa, Raluca Ada, Zeldovich, Nickolai, Balakrishnan, Hari; CryptDB: A Practical Encrypted Relational DBMS; Computer Science and Artificial Intelligence Laboratory Technical Report, MIT-SCAIL-TR-2011-005; Jan. 26, 2011, 14 pages.

International Search Report and Written Opinion of the International Searching Authority; PCT/US2014/049419; dated Nov. 17, 2014. 8 pages.

Petition for Inter Partes Review of U.S. Pat. No. 8,533,860 Challenging Claims 1-30 Under 35 U.S.C. 312 and 37 C.F.R. 42.104, filed Feb. 17, 2016, Before the USPTO Patent Trial and Appeal Board, IPR 2016-00600, 65 pages.

Petition for Inter Partes Review of U.S. Pat. No. 8,887,308 Challenging Claim 1 Under 35 U.S.C. 312 and 37 C.F. R. 42.104, dated Mar. 3, 2016, before the USPTO Patent Trial and Appeal Board, IPR 2016-00602, 58 pages.

Petition for Inter Partes Review of U.S. Pat. No. 8,402,555 Challenging Claims 1-26 Under 35 U.S.C. 312 and 37 C.F.R. 42.104, dated Mar. 22, 2016, before the USPTO Patent Trial and Appeal Board, IPR 2016-00789, 65 pages.

Corrected Petition for Inter Partes Review of U.S. Pat. No. 8,533,860 Challenging Claims 1-30 Under 35 U.S.C. .sctn.312 and 37 C.F.R. sctn.42.104, dated Mar. 14, 2016, before the USPTO Patent Trial and Appeal Board, IPR 2016-00600, 65 pages.

* cited by examiner

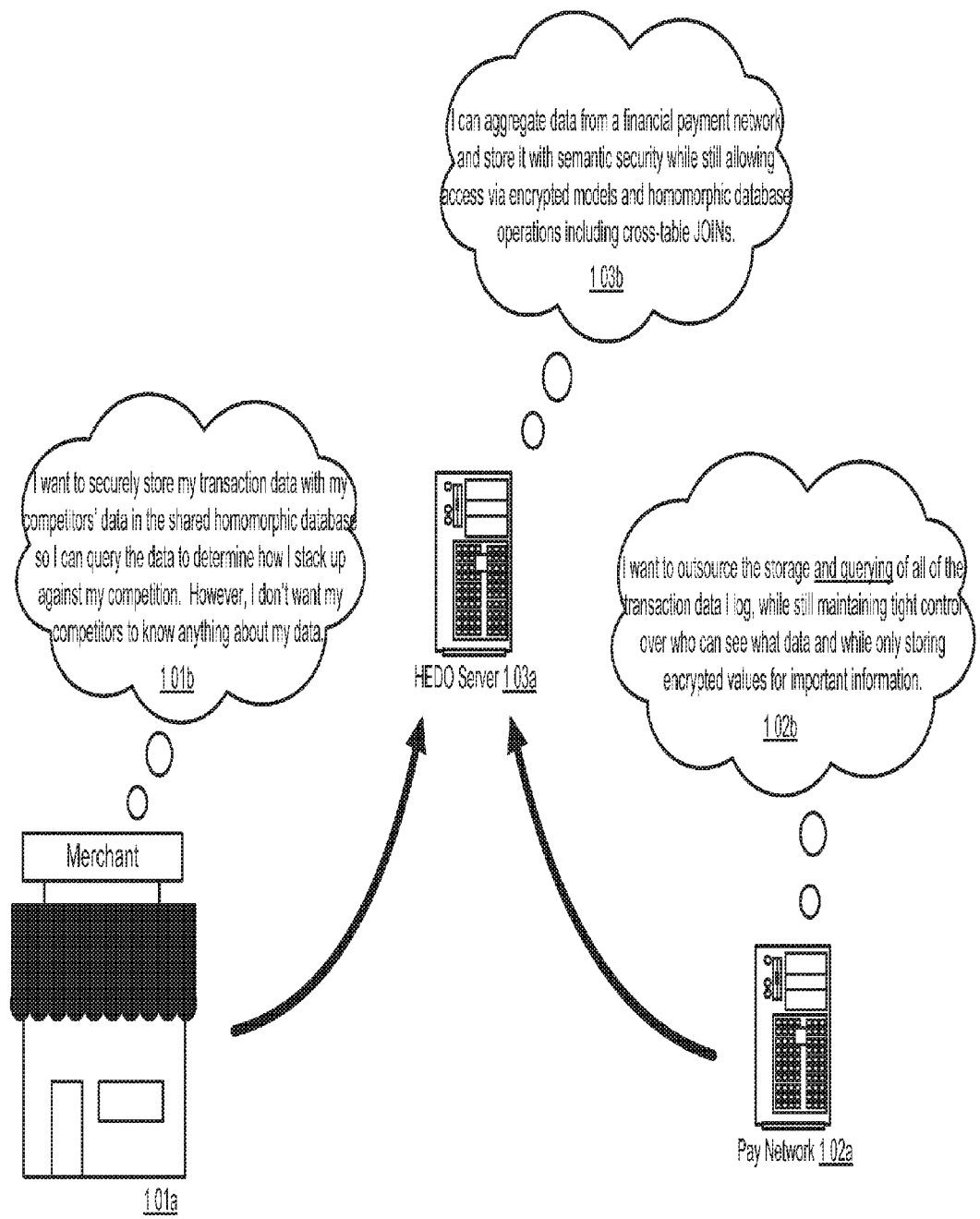
Figure 1　　Example: Homomorphically Encrypted Database Operations

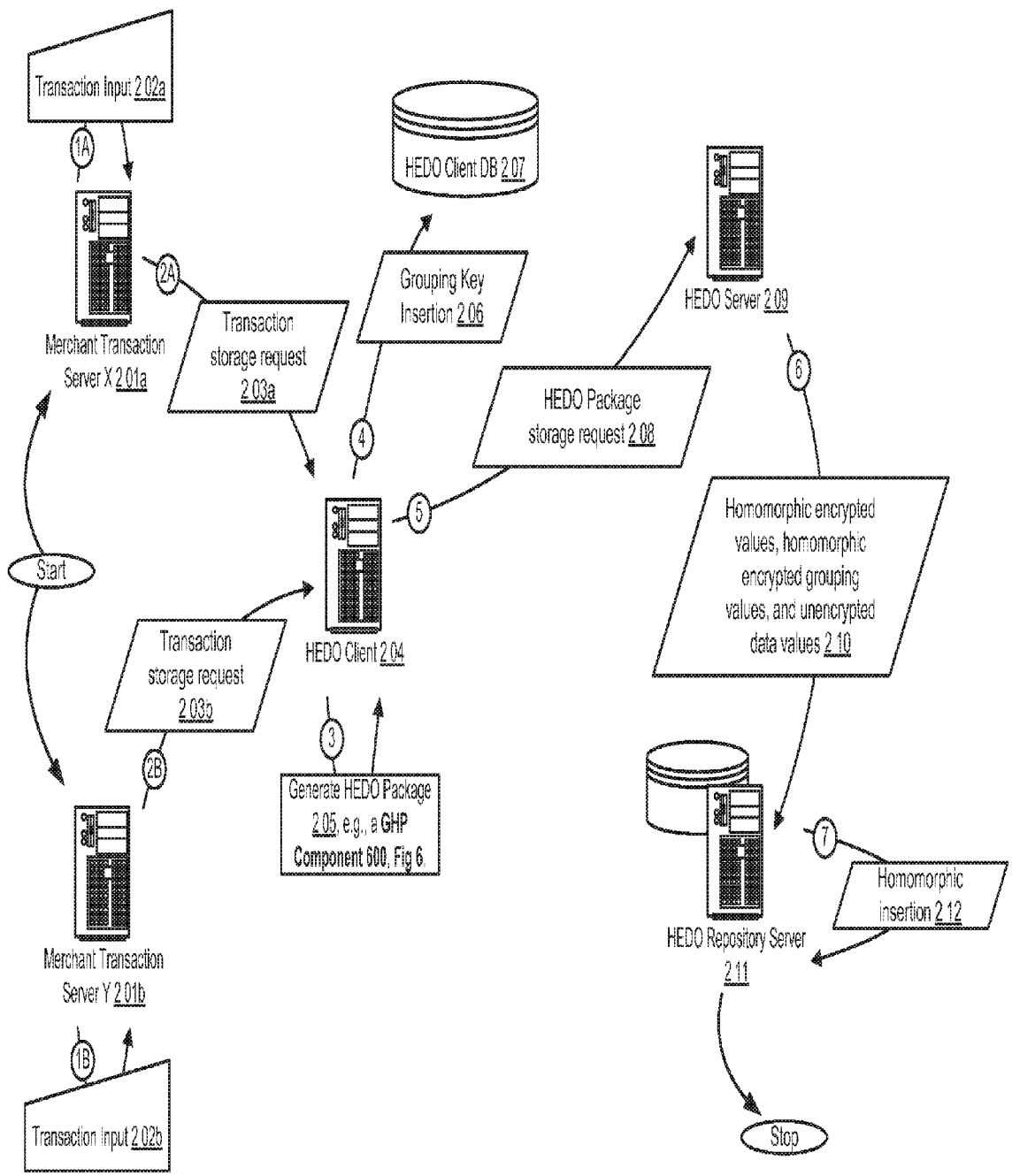
Figure 2  Example Data Flow: Homomorphically Encrypted Database Transaction Data Aggregation

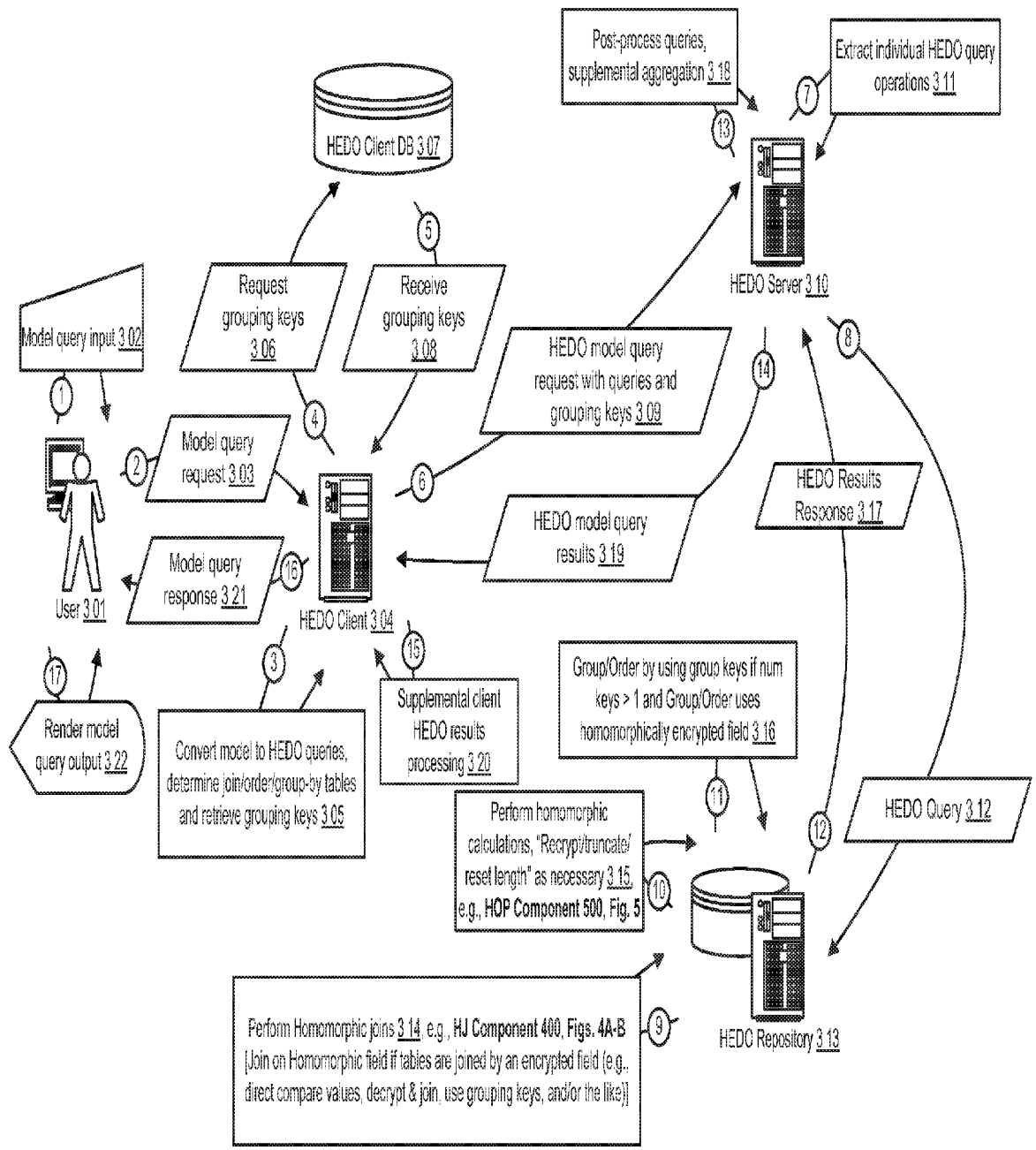
Figure 3 — Example Data Flow: Querying and Joining Homomorphically Encrypted Databases

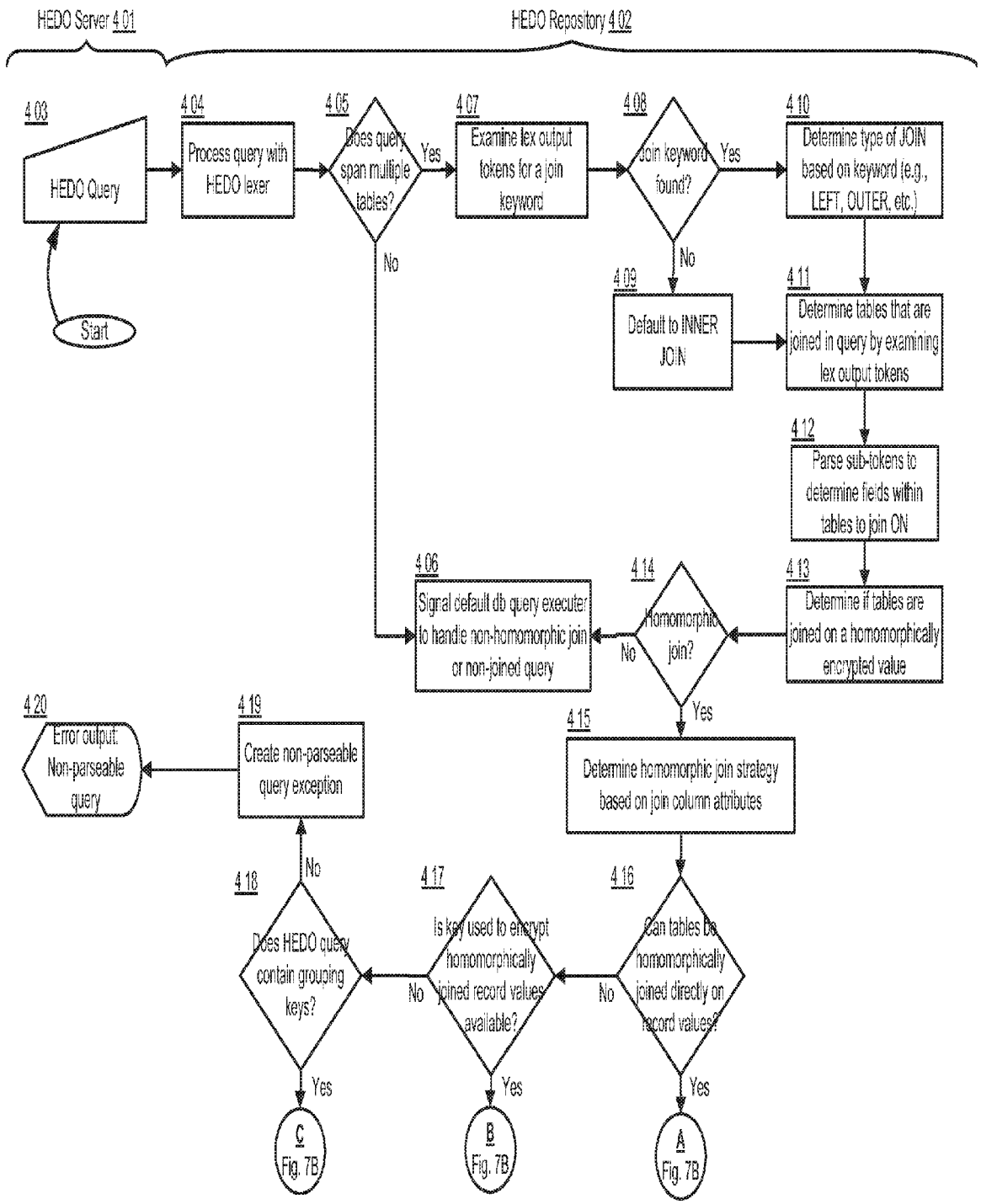
Figure 4A — Example Logic Flow: Performing Homomorphic Joins, e.g., HJ Component 400

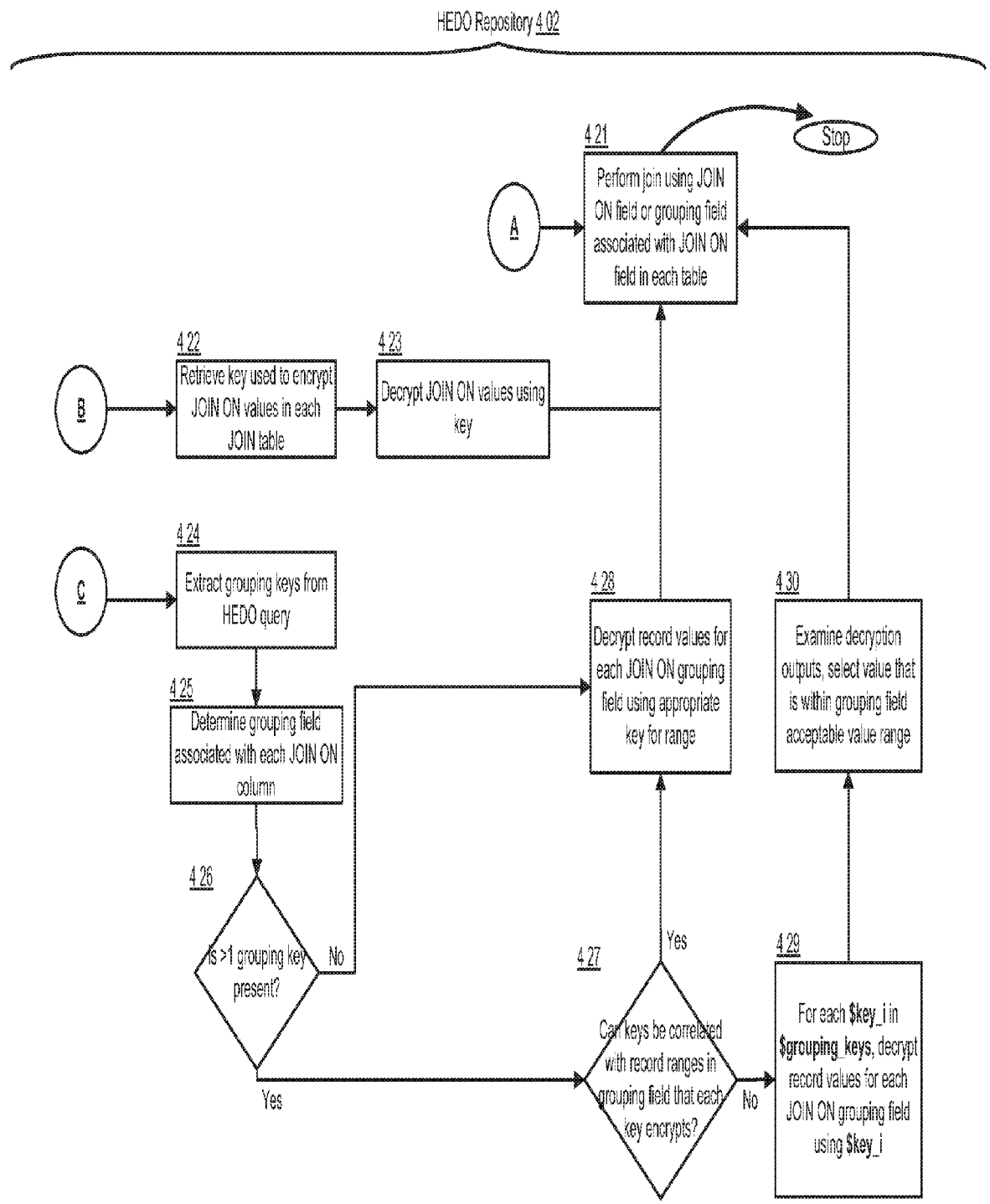
Figure 4B — Example Logic Flow: Performing Homomorphic Joins, e.g., HJ Component 400

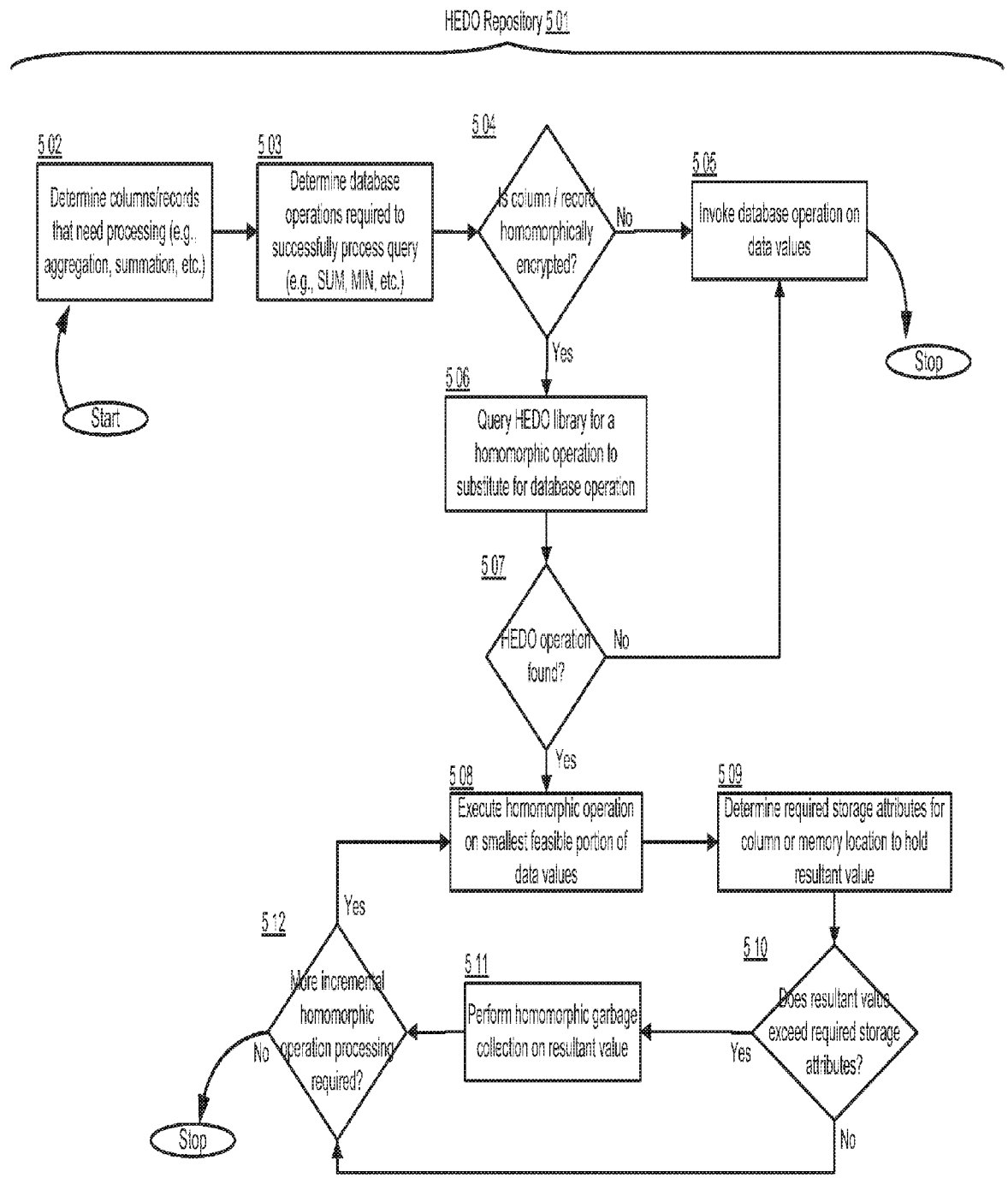
Figure 5 — Example Logic Flow: Homomorphic Calculations in Database Space, e.g., HOP Component 500

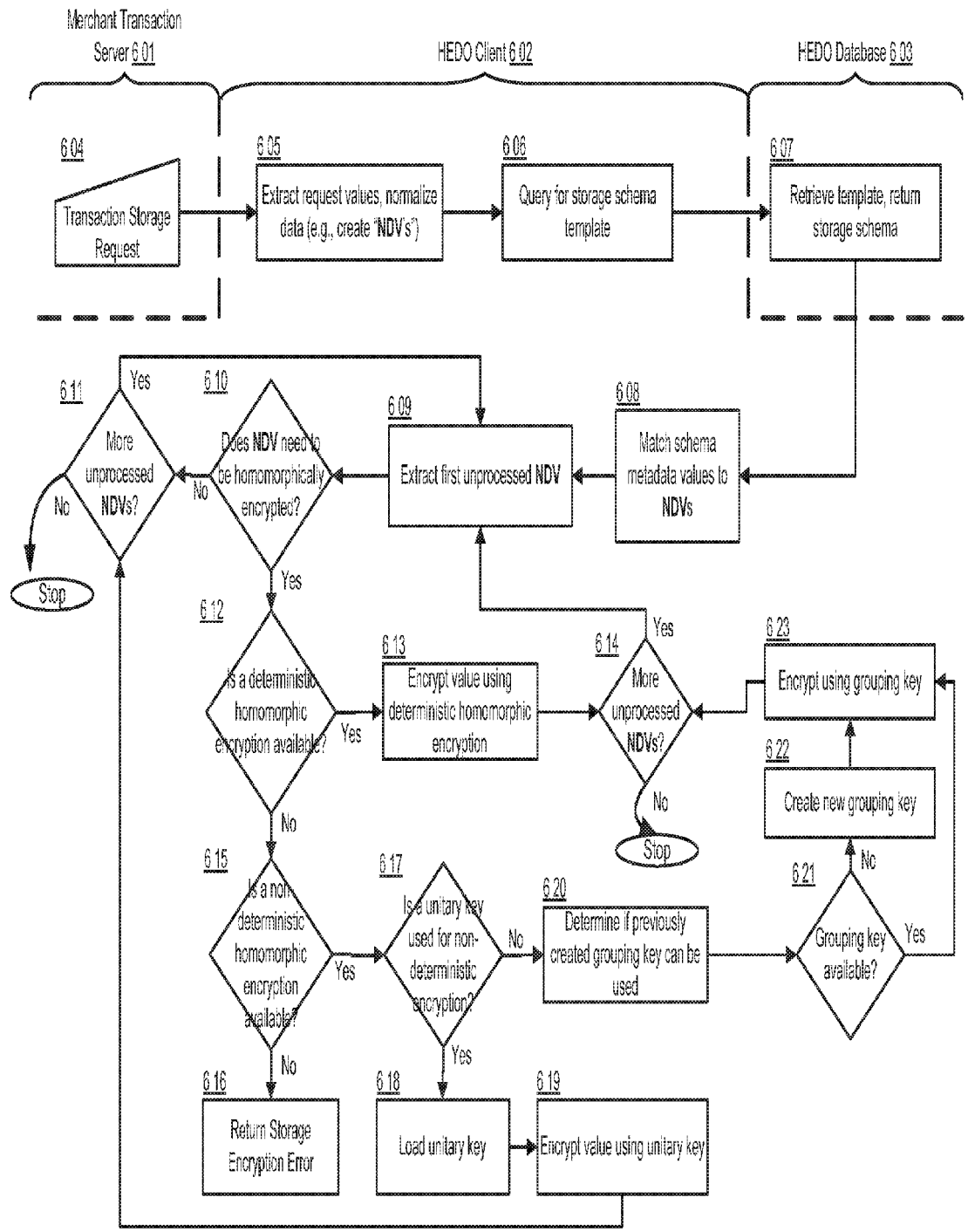
Figure 6      Example Logic Flow: Generating HEDO Packages, e.g. GHP Component 600

Example: HEDO User Interface

Figure 7C — Example: HEDO User Interface

Example: HEDO User Interface

Example: HEDO User Interface

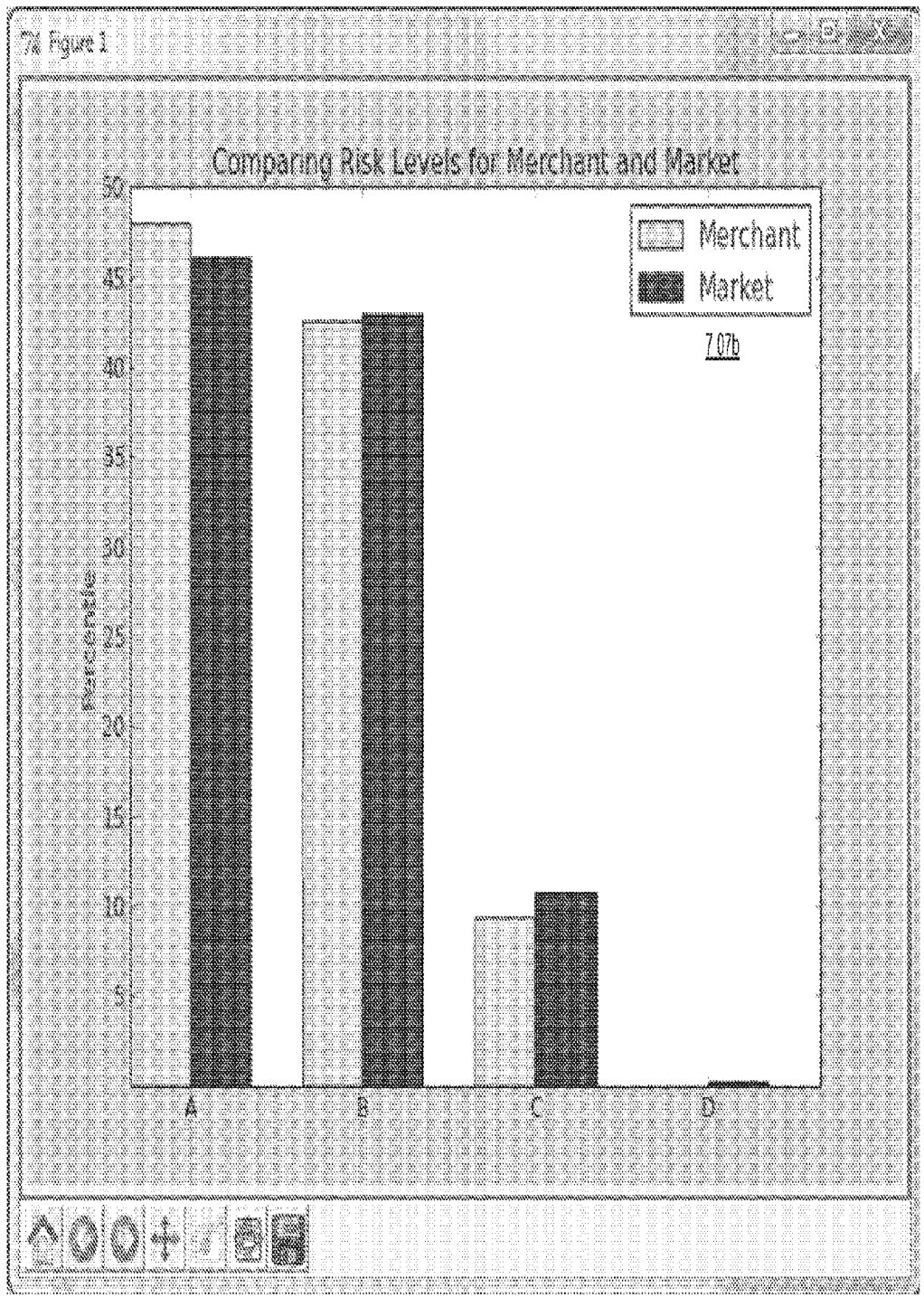
Figure 7G — Example: HEDO User Interface

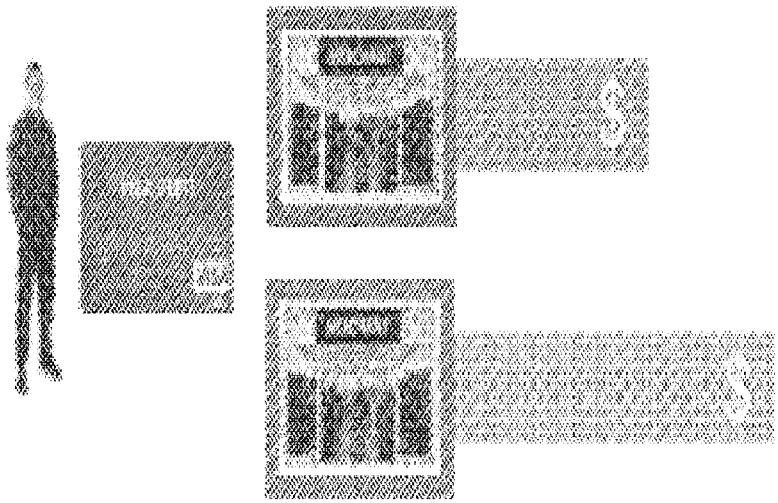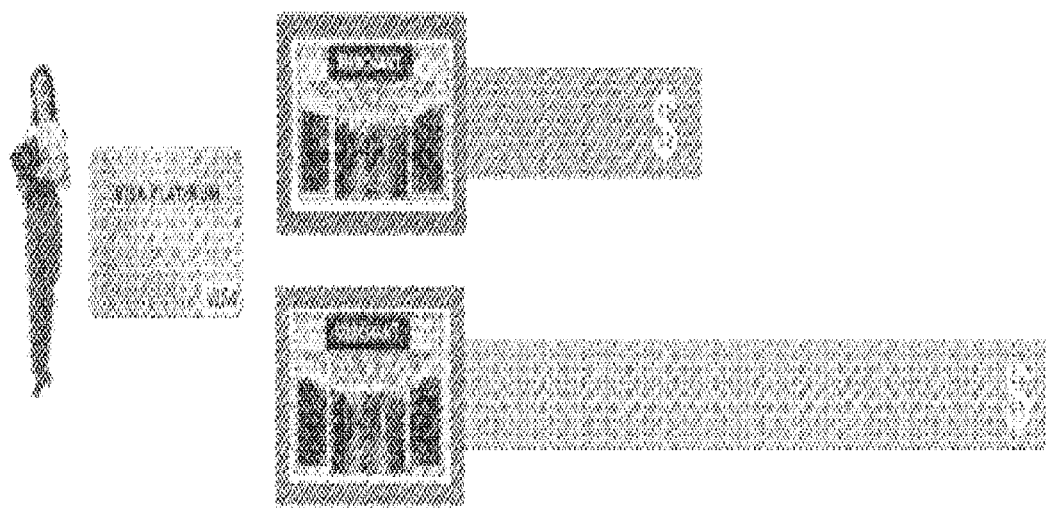
Figure 12

HOMOMORPHIC DATABASE OPERATIONS APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

This application claims priority to U.S. patent application Ser. No. 15/628,383, filed Jun. 20, 2017, which claims priority to U.S. patent application Ser. No. 14/449, 706, filed Aug. 1, 2014, now U.S. Pat. No. 9,722,777, which claims priority to United States Provisional Application Ser. No. 61/861,368, filed Aug. 1, 2013, entitled "Homomorphic Database Operations Apparatuses, Methods and Systems." The aforementioned applications are all hereby expressly incorporated herein by reference.

FIELD

The present innovations generally address the creation, maintenance, population and querying of secure databases containing full or partial data values stored using somewhat homomorphic, fully homomorphic, or other encryption scheme(s), and more particularly, include HOMOMORPHIC DATABASE OPERATIONS APPARATUSES, METHODS AND SYSTEMS.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Consumers engaging in transactions create large amounts of data, some of which may include private information. For example, a consumer's bank account number, balance, or mailing address may be private information. When making purchases, consumers may choose between multiple merchants offering similar services and in competition with one another. Merchants may desire to optimize the manner in which they attract and/or retain customers.

BRIEF DESCRIPTION OF THE DRAWINGS

The accompanying appendices and/or drawings illustrate various non-limiting, example, innovative aspects in accordance with the present descriptions:

FIG. 1 shows an example block diagram illustrating aspects of the HEDO, in one implementation of the HEDO operation;

FIG. 2 shows an example data flow illustrating aspects of homomorphically encrypted database transaction data aggregation, in one implementation of the HEDO operation;

FIG. 3 shows an example data flow illustrating aspects of querying and joining homomorphically encrypted databases, in one implementation of the HEDO operation;

FIGS. 4A-B show an example logic flow illustrating aspects of performing homomorphic joins, e.g., an example HJ Component, in one implementation of the HEDO operation;

FIG. 5 shows an example logic flow illustrating aspects of homomorphic calculations in database space, e.g., an example HOP Component, in one implementation of the HEDO operation;

FIG. 6 shows an example logic flow illustrating aspects of generating HEDO packages, e.g., an example GHP Component, in one implementation of the HEDO operation;

FIGS. 7A-G show example user interfaces illustrating aspects of the HEDO, in one implementation of the HEDO operation.

FIGS. 9-12 illustrate further aspects of the HEDO, in one implementation of the HEDO operation.

Figure 7A:
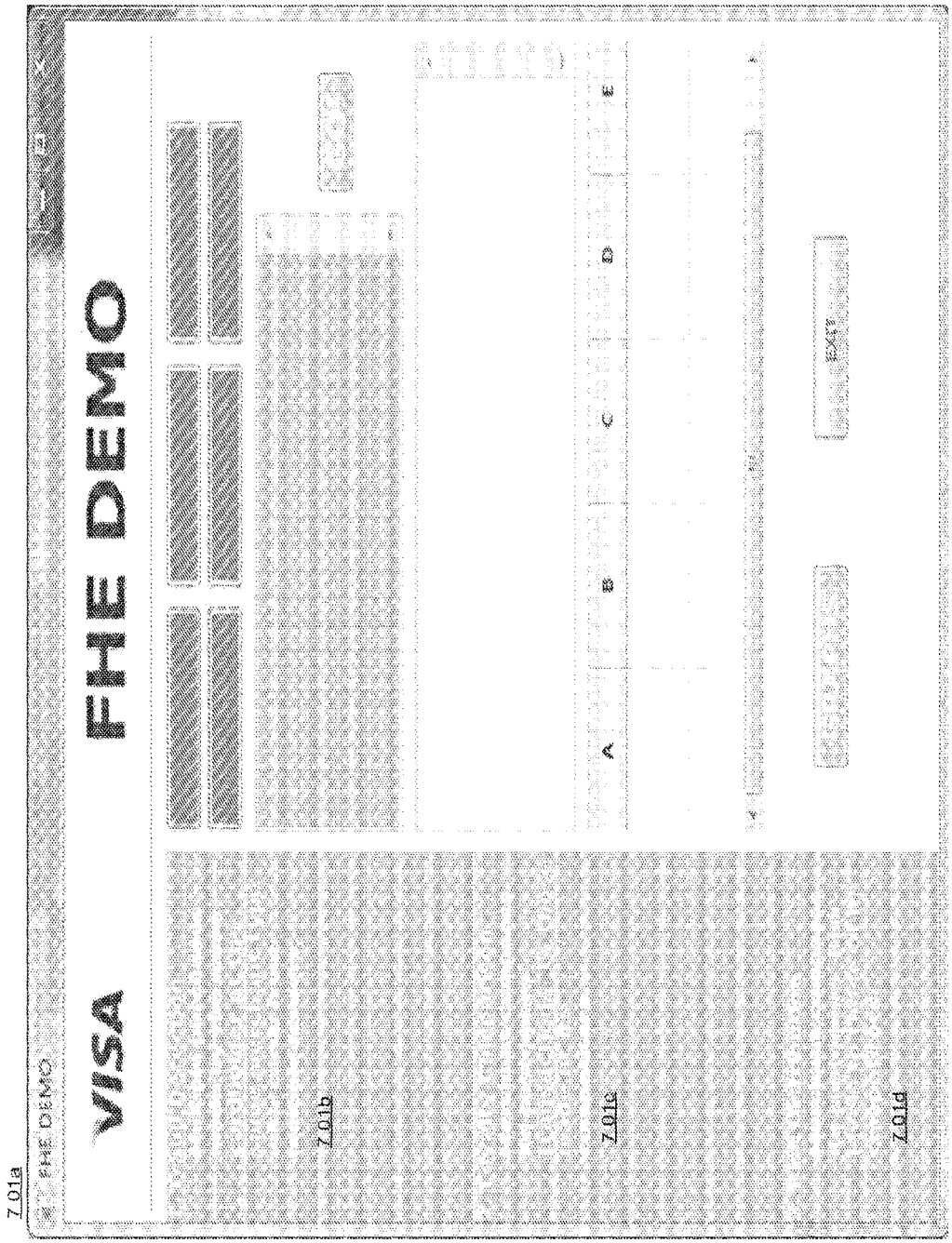

The leading number of each reference number within the drawings indicates the figure in which that reference number is introduced and/or detailed. As such, a detailed discussion of reference number lot would be found and/or introduced in FIG. 1. Reference number 201 is introduced in FIG. 2, etc.

DETAILED DESCRIPTION

Hedo

The HOMOMORPHIC DATABASE OPERATIONS APPARATUSES, METHODS AND SYSTEMS (hereinafter "HEDO" user interface) transform transaction data aggregation and homomorphic database model queries, via HEDO components, in response to user activities. In some embodiments, this is carried out in real time.

FIG. 1 shows an example block diagram illustrating aspects of the HEDO, in one implementation of the HEDO operation. In some embodiments, a merchant 101a may wish to store their transaction data in a shared homomorphic database along with their competitors' data, e.g., 101b. In so doing, the merchant can query the data to determine how they compare against competitors using a variety of comparison metrics without having access to their competitors' underlying data. Similarly, competitors can perform such queries without having access to the merchant's specific data. In one embodiment, a pay network server 102a may wish to outsource the storage and the querying of transaction data and may forward data that the server receives from merchants and consumers engaging in transactions, e.g., 102b. However, the pay network server may wish to maintain tight controls over the data such as limiting who can see the data stored as well as having assurances that important data point values remain encrypted when stored using the outsourced solution. In one embodiment, HEDO server 103a a may aggregate data from a financial payment network and store it such that the data is encrypted and has semantic security. Semantic security in this context meaning that an adversary with possession of the stored data would be unable to determine substantial properties or values of the stored data. In some embodiments, the HEDO server 103a a may allow access to the stored encrypted data and may perform operations to evaluate encrypted models through the use of homomorphic operations including homomorphic cross-table joins, e.g., 103b.

FIG. 2 shows an example data flow illustrating aspects of homomorphically encrypted database transaction data aggregation, in one implementation of the HEDO operation. In one embodiment, a transaction input 202a may be forwarded to merchant transaction server 201a, 201b. The merchant transaction server may process the a transaction and initiate a transaction storage request 203a,203b to HEDO client 204. A transaction storage request may be a request to encrypt certain values in the transaction storage request while leaving other values unencrypted, and facilitate the insertion of those values and that record into an HEDO repository server. In one embodiment, an HEDO package may be generated 205 upon the processing of the transaction storage request. Further detail with regard to HEDO package generation may be found with is respect to FIG. 6, e.g. a GHP component 600. In one embodiment, grouping keys that may be utilized by the HEDO client, the HEDO server, and/or the HEDO repository server at a future point may be generated during the creation of the HEDO package. In one embodiment, the grouping keys are inserted 206 into an HEDO client database 207. In other embodiments, the grouping keys may be retransmitted back to the merchant transaction server, forwarded to the HEDO server, stored in the HEDO repository, and/or the like. In one embodiment, the HEDO client may then transmit an HEDO package storage request 208 to HEDO server 209. The HEDO server may then store the package contents in a repository. An example HEDO repository server schema suitable for storing merchant transaction server transaction storage requests, substantially in the form of SQL statements is:

```
CREATE TABLE IssuerE
    (Number VARCHAR(16) PRIMARY KEY
);
CREATE TABLE MerchantE
    (Number VARCHAR(16) PRIMARY KEY,
        Category CHAR(4) NOT NULL
);
CREATE TABLE CardholderE
    (Number VARCHAR(250000) PRIMARY KEY, --HOMOMORPHICALLY ENCRYPTED
        Surname VARCHAR(64) NOT NULL,
        Issuer VARCHAR(16) NOT NULL,
        Product VARCHAR(3) NOT NULL,
        Risk VARCHAR(50000) NOT NULL --HOMOMORPHICALLY ENCRYPTED
);
CREATE TABLE TransactionE
    (Number VARCHAR(64) PRIMARY KEY,
        Merchant VARCHAR(16) NOT NULL,
        Cardholder VARCHAR(250000) NOT NULL, --HOMOMORPHICALLY ENCRYPTED
        Type VARCHAR(3) NOT NULL,
        Amount VARCHAR(250000) NOT NULL --HOMOMORPHICALLY ENCRYPTED
);
CREATE TABLE PurchaseE
    (Transaction VARCHAR(64) NOT NULL,
        Surname VARCHAR(2048000) NOT NULL, --HOMOMORPHICALLY ENCRYPTED
        Merchant VARCHAR(16) NOT NULL,
        Product VARCHAR(32) NOT NULL,
        Quantiy INTEGER NOT NULL
);
CREATE TABLE ProductE
    (Code VARCHAR(32) PRIMARY KEY,
        Good VARCHAR(256) NOT NULL,
        Price DECIMAL(6,2) NOT NULL
);
```

An example alternative HEDO repository server schema suitable for storing merchant transaction server transaction storage requests and maintaining grouping values for use with grouping keys, substantially in the form of SQL statements is:

```
CREATE TABLE IssuerE
    (Number VARCHAR(16) PRIMARY KEY
);
CREATE TABLE MerchantE
    (Number VARCHAR(16) PRIMARY KEY,
        Category CHAR(4) NOT NULL
);
CREATE TABLE CardholderE
    (Number VARCHAR(250000) PRIMARY KEY,
        Number_grp VARCHAR(250000) NOT NULL,
        Number_gkey VARCHAR(250000) NOT NULL,
        Surname VARCHAR(64) NOT NULL,
        Issuer VARCHAR(16) NOT NULL,
        Product VARCHAR(3) NOT NULL,
        Risk VARCHAR(50000) NOT NULL,
        Risk_grp VARCHAR(50000) NOT NULL,
        Risk_gkey VARCHAR(50000) NOT NULL
);
CREATE TABLE TransactionE
    (Number VARCHAR(64) PRIMARY KEY,
        Merchant VARCHAR(16) NOT NULL,
        Cardholder VARCHAR(250000) NOT NULL,
        Cardholder_grp VARCHAR(250000) NOT NULL,
        Cardholder_gkey VARCHAR(250000) NOT NULL,
        Type VARCHAR(3) NOT NULL,
        Amount VARCHAR(250000) NOT NULL,
        Amount_grp VARCHAR(250000) NOT NULL,
        Amount_gkey VARCHAR(250000) NOT NULL
);
CREATE TABLE PurchaseE
    (Transaction VARCHAR(64) NOT NULL,
        Surname VARCHAR(2048000) NOT NULL,
        Surname_grp VARCHAR(2048000) NOT NULL,
        Surname_gkey VARCHAR(2048000) NOT NULL,
        Merchant VARCHAR(16) NOT NULL,
        Product VARCHAR(32) NOT NULL,
        Quantity INTEGER NOT NULL
);
CREATE TABLE ProductE
    (Code VARCHAR(32) PRIMARY KEY,
        Good VARCHAR(256) NOT NULL,
        Price DECIMAL(6,2) NOT NULL
);
```

In some embodiments, the repository is an open source or commercial database running and in communication with the HEDO server 209. Databases suitable for this purpose include but are not limited to PostgreSQL, MySQL, Oracle, and/or the like. In other embodiments, the HEDO repository may be contained on a different server such as the HEDO repository server 211, and/or the HEDO client 204 itself. In one embodiment, homomorphically encrypted values, homomorphic encrypted grouping values, and/or unencrypted data values, e.g., 210, may be forwarded from the HEDO server 209 to the HEDO repository server 211. The HEDO repository server 211 may then perform an insertion into the repository of the encrypted and non-encrypted values, 212. In some embodiments, the HEDO repository server may be a database server that is configured with user-defined functions to further process the encrypted and/or unencrypted values contained in homomorphic insertion 212. For example, in one embodiment, all of the data forwarded to the HEDO repository server 211 may be in unencrypted form. In such embodiments, a user defined function, stored procedure, and/or the like running and in communication with HEDO repository server 211 may selectively or completely encrypt the values from homomorphic insertion 212 using either deterministic or non-deterministic homomorphic encryption. An example user defined function suitable for encrypting a binary decimal value (such as a digit of a credit card number), substantially in the form of Python executable code is:

```
def BCD_Encrypt(Number,Lambda,p):
    number = abs(Number) % 10 # ensure 0-9 [no A-F!]
    Eight = ((Number & 0x08) != 0)
    Four  = ((Number & 0x04) != 0)
    Two   = ((Number & 0x02) != 0)
    One   = ((Number & 0x01) != 0)
    BCD = [Encrypt(One  ,Lambda,p),\
           Encrypt(Two  ,Lambda,p),\
           Encrypt(Four ,Lambda,p),\
           Encrypt(Eight,Lambda,p)]
    return BCD
```

In other embodiments, more complicated validation may be performed on the data before or after encryption. An example of such a validation may be the LUHN algorithm used for validating credit card numbers. An example implementation of the LUHN algorithm, suitable for use on homomorphically encrypted HEDO data, substantially in the form of Python code is:

```
def LuhnAlgorithm(BCD,PAN_Length):
    Zero = cZERO; Tally0 = BCD_Zero; Tally1 = BCD_Zero; Tally2 = BCD_Zero
        # Double the BCD values of selected digits
        # starting at the check digit.
        for Position in range(PAN_Length-2, -1, -2):
            Digit = BCD[Position]
            [Digit0,Digit1] = BCD_Double(Digit)
            Digit = BCD_Resolve(Digit0,Digit1)
            BCD[Position] = Digit
        # Sum all the resulting digits, producing
        # a tally of their values.
        for Position in range(PAN_Length):
            Digit = BCD[Position]
            Answer = BCD_Sum(Tally0,Tally1,Tally2,Digit)
            Tally0 = Answer[0]; Tally1 = Answer[1]; Tally2 = Answer[2]
        # Return the least significant BCD digit
        # (modulo ten operation).
        return Tally0
```

FIG. 3 shows an example data flow illustrating aspects of querying and joining homomorphically encrypted databases, in one implementation of the HEDO operation. In one embodiment, user 301 may initiate a model query input 302. A model query input may consist of a query or query parameters that are suitable for querying an HEDO repository. In one embodiment, suitable query models may be stored on HEDO server 310, and called by name by user 301 in a model query input 302. In one embodiment, HEDO server 310 may contain a parameterized query which the model query input may invoke by name. For example, a query "loyalty_comparison" stored on or in communication with the HEDO server may be invoked through a model query referencing the query by name and providing suitable parameters such as a merchant identifier, issuer identifier, and/or the like. Example model query requests may be found herein and particularly with respect to FIG. 7.

In one embodiment, the model query request 303 is forwarded to HEDO client 304. The HEDO client may convert the model query to HEDO queries, may a determine the join, order, and/or grouped by tables required to execute the query, and/or retrieve grouping keys from a database in communication with the HEDO client, e.g., 305. In one embodiment, the HEDO client 304 may request grouping keys from HEDO client database 307, e.g., request grouping keys 306. The database may retrieve keys associated with tables of the query that may require aggregation, cross-table joining, and/or the like. In one embodiment, the HEDO client may forward an HEDO model query request containing HEDO queries and, optionally, required grouping keys, e.g. 309 to HEDO server 310. An example HEDO model query request, substantially in the form of an HTTP(S) POST message including XML-formatted data, is provided below:

```
POST /hedo_model_query_request.php HTTP/1.1
Host: www.hedoserver.com
Content-Type: Application/XML
Content-Length: 667
<?XML version = "1.0" encoding = "UTF-8"?>
<hedo_model_query_request>
    <timestamp>2020-12-12 15:22:43</timestamp>
    <user_name>HEDO_CLIENT</user_name>
    <credentials>
        <password>secretpass1234</password>
        <private_key>h767kwjiwnfe456#@hnniimidrtsxbi</private_key>
    </credentials>
    <model_query name="loyalty_comparison">
        <query num=1>
            select MerchantE.Category into MCC from
            MerchantE where MerchantE.Number = '{Merchant}'
```

```
        </query>
        <query num=2>
            select CardholderE.Surname, TransactionE.Amount
            from TransactionE, CardholderE where
            CardholderE.Number = TransactionE.Cardholder
            and TransactionE.Merchant = '{Merchant}'
        </query>
        <query>
            ...
        </query>
    </model_query>
    <grouping_keys>
        <group name="CardholderE.Number = TransactionE.Cardholder">
            <table1 name="CardholderE" field="Number">
                <key value="id:1-2000">
                    Jukyftrddesrsdxerr43ser43wshryt
                    Erwsadxtyjfgkftyresagt43esy45wuykg
                    Sre4fytkuhopj;/945ur6tsgred-yukg
                </key>
                <key value="id:rest">
                    ...
                </key>
                <key default="true">
                    ...
                </key>
                <key>
                    ...
                </key>
            </table1>
            <tableN>
                ...
            </tableN>
        </group>
    </grouping_keys>
</hedo_model_query_request>
```

In some embodiments, HEDO server 310 may receive the model query request and extract individual HEDO query operations, e.g., 311. For example, in one embodiment, an HEDO model query may contain multiple queries. An example first query may include a query that determines a merchant's customer loyalty score. In such an embodiment, a second query may then determine the loyalty scores of the merchant's customers with respect to other merchants in competition with the querying merchant. In so doing, the HEDO server may execute multiple discrete model queries and, optionally, integrate the resultant values either through SQL aggregation options, user-specified function processing, and/or the like. In one embodiment, a first HEDO query 312 is forwarded to the HEDO repository 313. As discussed herein, in some embodiments, the HEDO repository is in fact a database in communication with HEDO server 310. In other embodiments, the repository is stored on a third-party cloud provider platform such as Amazon AWS™, RackSpace Cloud™, and/or the like.

In one embodiment, the HEDO repository may determine that multiple tables are required to be queried in order to successfully process the query, and may further determine that table values that are to be joined on are in fact homomorphically encrypted values. The HEDO repository may process the HEDO query and perform the required homomorphic joins, e.g. 314. Further detail regarding performing homomorphic joins may be found with respect to FIGS. 4A-B, e.g., an example HJ Component 400. In some embodiments, the homomorphically joined tables may require additional homomorphic calculations to be performed on the results set in order to complete the HEDO query execution, e.g., 315. For example, the homomorphically joined results set may require summation. However, because the values are homomorphically encrypted, traditional or default summation interfaces integrated into the database software may not be suitable for performing summations on large or complex data values such as may be found with respect to homomorphic encryption. As such, specialized homomorphic operations may be performed on homomorphic data instead of the normal equivalent database operations. In other embodiments, the HEDO repository may determine that the interfaces integrated into the database software are suitable for performing calculations on homomorphically encrypted data. Periodically, the HEDO repository may re-crypt, truncate, and/or reset the length of a final or interim homomorphic calculation value in order to maintain the ability for the HEDO repository and/or an underlying database implementation to be able to maintain the values and usable form. Further detail with regard to performing homomorphic calculations, re-crypting, truncating, and/or resetting the length of homomorphic calculation outputs (e.g., "Homomorphic garbage collection"), may be found with respect to FIG. 5, e.g., an example HOP component 500. In one embodiment, upon the completion of the homomorphic calculations on the HEDO repository results set, aggregation, grouping and/or ordering of the return values may be required. These operations may, in one embodiment, be performed on homomorphically encrypted data. As such, facilities such as those described with respect to homomorphic joins may be employed in order to facilitate the grouping, ordering, and/or other aggregation of the results set. In one embodiment, wherein the aggregation column returned from the HEDO repository has been encrypted using a key that is known or obtainable, the HEDO repository may use the key to decrypt and group/order on a homomorphically encrypted field, e.g., 316. In one embodiment, the HEDO repository may return the results, e.g., HEDO results response 317. An example HEDO results response, substantially in the form of an HTTP(S) POST message including XML-formatted data, is provided below:

```
POST /hedo_results_response.php HTTP/1.1
Host: www.hedoserver.com
Content-Type: Application/XML
Content-Length: 667
<?XML version = "1.0" encoding = "UTF-8"?>
<hedo_results_response>
    <timestamp>2020-12-12 15:23:18</timestamp>
    <user_name>HEDO_REPOSITORY_SERVER</user_name>
    <credentials>
        <password>secretpass5678</password>
        <private_key>TGDFRRED456#@hnniimidrtsxbi</private_key>
    </credentials>
    <query_results name="loyalty_comparison">
        <component val="1" name="merchant_customer_loyalty">
            <res type="homomorphic_encrypted">
                {merchant}'s customers are {crypt_loyal_val} loyal
            </res>
            <val name="crypt_loyal_val"
                    decryptable_by="client_server_only"
                    HEDO_server_can_decrypt="false">
                11101000100010111111000001111
                00011101111000110101011111101111
            </val>
        </component>
        <component val="2" name="customer_market_loyalty">
            <res type="cleartext_result" cmployal="78%">
                Merchant {merchant}'s customers are {cmployal}
                more loyal to competitors among the group Gap
                and Nordstrom
            </res>
        </component>
    </query_results>
<hedo_results_response>
```

The HEDO server may perform post-processing of the query results and/or supplemental aggregation 318. It should be noted that alternative implementations of the HEDO may perform homomorphic joining, homomorphic aggregation, homomorphic grouping, and/or the like at any point in the data path. In so doing, and HEDO may be configured such that more or less computation may be outsourced to a third-party less-trusted server depending on varying levels of user risk tolerance. An example implementation wherein HEDO server 310 performs homomorphic aggregation/grouping on a result set returned from HEDO repository 313, written substantially in the form of executable Python code is:

```
def Query(Parameters):
    #Execute HEDO query
    SQL_Command = Query1A.format(**Parameters)
    Cursor.execute(SQL_Command)
    Rows = Cursor.fetchall( )
    Results = list( ); MyResults = list( )
    for Row in Rows:
        Risk =
        Encryption.ASCII_Decrypt(eval(Row[0]),Encryption.p)
        Count = Row[1]
        Results.append(list([Risk,Count])
    print 'A total of',len(Results),'rows were returned.'
    # Perform HEDO aggregation in memory on server
    RiskValues = sorted(map(lambda x: x[0], Results))
    RiskValues = [k for k,g in itertools.groupby(RiskValues)]
    for Risk in RiskValues:
        Members = [Item for Item in Results if
                Item[0] == Risk]; Count = 0
        for Member in Members:
            Count += Member[1]
        print 'Risk level',Risk,'had',Count,'rows.'
        Count = Encryption.Binary_Encrypt
                (Count,Encryption.Lambda,Encryption.p)
        MyResults.append
                (dict(zip(Query1Fields,list([Risk,Count]))))
    print
```

In one embodiment, HEDO server 310 may return the aggregated results to HEDO client 304, e.g., HEDO model query results 319. As discussed above, the HEDO client may perform supplemental client-side HEDO result processing 320. For example, in an HEDO configuration wherein the keys required to properly aggregate and/or group result data are unavailable to the HEDO server, the HEDO client may perform the role of aggregator while the HEDO server and/or HEDO repository performs the role of querying. Such a configuration may be beneficial in the case where an HEDO client is a trusted server and the HEDO server and/or HEDO repository are suspect or less-trusted servers. In one embodiment, HEDO client 304 will return the query results, e.g., model query response 321 and the user client device may render the model query output, e.g., 322.

FIGS. 4A-B show an example logic flow illustrating aspects of performing homomorphic joins, e.g., an example HJ Component, in one implementation of the HEDO operation. In one embodiment, and HEDO query 403 may be received from HEDO server 401. The HEDO repository 402, which may itself be a server or a database in communication with the HEDO server, may process the HEDO query using a HEDO lexer. A lexical analyzer such as Lex and/or other suitable commercial products may be used for this purpose. In one embodiment, if a query is determined not to span multiple tables 405, a signal may be sent to the default database query executor to handle the non-joined query 406. In other embodiments, if the query is determined to spend multiple tables, the lex output tokens may be searched for a joining keyword 407. A joining keyword may be any standard or nonstandard SQL keyword that designates a joined query. Examples of joining keywords include INNER, OUTER, and/or the like. If a joining keyword is not found 408, the HEDO repository may in one embodiment default the query to an INNER JOIN 409. In other embodiments, if a joining keyword is found 408 the type of joining may be determined based on the joining keyword token 410. For example, a LEFT join keyword may instruct the HEDO repository to later select a particular homomorphic joins strategy based on the joined type. In one embodiment, the tokens may be examined to determine the tables that are joined in the query 411. Furthermore, the relevant tokens may be further processed or parsed to determine the fields upon which the tables should be joined 412. For example, in one embodiment, the text "foo.bar" may signify that the "bar" field on table "foo" is to be joined. In one embodiment, the HEDO repository and/or HEDO server may determine if the tables are to be joined on a homomorphic Lee encrypted value. Homomorphic Lee encrypted fields may have certain characteristics that make JOIN strategies employed by open source and commercial database systems ineffective to join tables containing homomorphic Lee encrypted values. For example, values that have had homomorphic operations performed upon them may grow exponentially in the operations performed. As more and more storage is required to encapsulate the record value, joins of homomorphic values may swamp built in joined query executions. Therefore, if the join is not a homomorphic join 414, the join may be passed to the default database query executor such that that query executor may handle the non-homomorphic join 406. In other embodiments, if the join is a homomorphic join 414, the HEDO repository 402 may determine a homomorphic join strategy based on the join column attributes 415. The join column attributes may be attributes that are inherent to the field type of the joined column, such as extremely large variable character fields or large integer fields used in contexts where smaller storage requirements would be expected. The join strategy may also be determined based on the join column names, comments associated with the join columns and stored with the database table, and/or the like. In some embodiments, the homomorphically encrypted field values may have been encrypted using a deterministic homomorphic strategy. As such, when a given value such as a consumer's credit card number is deterministically homomorphically encrypted, there can be assurances that future encryptions of the same value will result in the same ciphertext. Under this homomorphic join strategy record values for homomorphically encrypted data may be is directly compared across database tables as the inherent variability and noise associated with various encryption schemes may have been minimized through the use of a deterministic homomorphic encryption scheme. In one embodiment, if the tables can be homomorphically joined directly on the record values 416, then the join may be performed using the appropriate JOIN ON field as though the field were a non-encrypted value 421. In other embodiments, if the tables may not be homomorphically joined directly on the record values 416, it may be determined whether the key that was used to homomorphically encrypt the record values is available to the HEDO repository 402, e.g., 417. For example, in one embodiment, the HEDO repository may query an HEDO client for an encryption key to use in performing the requested join. In other embodiments, the HEDO repository and/or the HEDO server may directly store the required join key or other structure such as a garbled circuit that may be used to perform the join. In one embodiment, the HEDO repository 402 may retrieve the key used to encrypt JOIN ON values in each JOIN table 422. The retrieved key may then be used to decrypt the required JOIN ON values 423. In one embodiment, the join may now be performed using the decrypted JOIN ON values, e.g. 421. In still other embodiments, if the key that was used to encrypt homomorphically the joined record values is not available 417, the HEDO query may be analyzed to determine if it contains one or more grouping keys 418. If no grouping keys are available a non-parsable query exception may be generated 419 and returned to the HEDO server 401. The HEDO server 401 may in turn output a non-parsable query error. In other embodiments, if the HEDO query does contain grouping keys 418 the keys may be extracted from the HEDO query 421 and a grouping field associated with each column required for the join may be determined 425. Grouping fields may, in one embodiment, be additional fields that are either added directly to the database table schema or maintained in a hidden table or other structure suitable for retrieval, such that while the value of the associated encrypted field may not be available and no information regarding the similarity of the unencrypted values may be determined as a nondeterministic homomorphic encryption scheme may have been used, the grouping field may be utilized to enable a database join to be completed. In some embodiments, the grouping fields may contain values that have been stored as a result of a deterministic encryption scheme. In such embodiments, the penetration or decryption of the encrypted grouping field values would only compromise the underlying value used for grouping or joins. In still other embodiments, the grouping fields may be encrypted using a nondeterministic encryption scheme such that one or more grouping keys may be required in order to determine the underlying grouping field value and therefore in order to perform a successful join. In one embodiment, if only one grouping keys present 426, that grouping key may be assumed to apply to all grouping field values and as such may be used to decrypt the record values for each JOIN ON grouping field using the singular key 428. In other embodiments, if more than one grouping keys present 426, the HEDO repository 402 may determine whether the plurality of grouping keys may be correlated with record ranges in the grouping field that each key correspondingly encrypts 427. In one embodiment, the plurality of keys may be used to decrypt the grouping field values in total by a applying the decryption keys to the various ranges to which they apply 428. In still other embodiments, if the plurality of grouping keys cannot be definitively associated with the range of grouping field values that they encrypt 427, for each key within the plurality of grouping keys the HEDO repository may decrypt the record values for each JOIN ON grouping field using the cake 429. In one embodiment, the decrypted output values for a given grouping field value may be examined to determine the value that is what in the grouping field acceptable value range and that value may then be used as the decrypted grouping field value 430. In further embodiments, upon completion of the decryption, a join may be performed using the decrypted grouping field values associated with the JOIN ON field in each table 421.

FIG. 5 shows an example logic flow illustrating aspects of homomorphic calculations in database space, e.g., an example HOP Component, in one implementation of the HEDO operation. In one embodiment, the HEDO repository 501 may analyze a joined or non-joined query to determine which columns or records in the result set require further processing. Further processing may include grouping, aggregation, summation, user-specified function processing, and/or the like 502. In one embodiment, the processing needs may be used to determine which underlying database operations are required to successfully process the query completely 503. For example, field values may be required to be added in order to determine a sum value of all records returned. Similarly, result set field values may be required to be compared against each other so as to determine the minimum value within the result set. However, in some embodiments, the presence of homomorphically encrypted data may frustrate the execution of such database operations. In one embodiment, if the column, record, and/or value to be operated upon in the result set is not homomorphically encrypted the HEDO repository may invoke the normal underlying database operation on the value 505. In other embodiments, if the value is homomorphically encrypted 504 the HEDO repository may query a homomorphic library for a homomorphic operation that may be substituted for the database operation. For example, in the case where multiple values in a result set must be added in order to determine a final value, the homomorphic library may contain a homomorphically optimized addition function to facilitate the adding of homomorphically encrypted values 506. In other embodiments, the homomorphic operation is the same as the default database operation. If a homomorphic operation is not found, in one embodiment, the default database operation may still be applied to the data values. In so doing, operations that in their normal usage would work equally well on homomorphically encrypted values may be utilized without modifications for homomorphic encryption. In other embodiments, if a homomorphic operation is found 507, the homomorphic operation may be executed on a portion or all of the data values 508. In some embodiments, the smallest feasible portion of a data value may be used to perform a homomorphic operation. For example, one implementation of a non-homomorphic mean value determination function may sum all of the result values and then divide the total by the number of values encountered. In a homomorphic version of mean value determination, however, it may be more computationally beneficial to incrementally calculate the mean as each additional record value is added. In one embodiment, the required storage attributes for a column or a memory location that may hold the resultant value from the homomorphic operation may be determined 509. If the value resulting from the homomorphic operation exceeds the required storage attributes 510, homomorphic garbage collection may be performed on the resultant value 511. Homomorphic garbage collection may, in some embodiments, be used to shorten or truncate the length of the value produced by a homomorphic operation. In some embodiments, the garbage collection may take the form of a full decryption followed by a full encryption. In other embodiments, the garbage collection may take the form of a re-crypt operation, wherein the actual unencrypted value of the result of the homomorphic operation is never calculated by the garbage collection function. In one embodiment, if more incremental homomorphic operation processing is required 512, the next feasible portion of the data value may be homomorphically evaluated along with the previous value, e.g., 508.

FIG. 6 shows an example logic flow illustrating aspects of generating HEDO packages, e.g., an example GHP Component, in one implementation of the HEDO operation. In one embodiment, merchant transaction server 601 may transmit a transaction storage request 604 to HEDO client 602. In one embodiment, the HEDO client may extract values from the transaction storage request and normalize the data, e.g., 605. Normalizing may include trimming strings, casting values two different data types, querying a data schema table to determine required properties of a transaction storage request value, and/or the like. In one embodiment, the HEDO client may query for a storage schema template 606. The HEDO database 603 may retrieve the template and return an applicable storage schema 607. In one embodiment, the HEDO client may then match the schema metadata values to the normalized data values extracted from the transaction storage request, e.g., 608. In one embodiment, all of the values are marked as unprocessed and the first unprocessed value is then extracted 609. If the unprocessed value does not need to be homomorphically encrypted 610, the HEDO client may determine whether there are more unprocessed values 611. If there are no unprocessed values the procedure may exit. If there are unprocessed values the next unprocessed value may be extracted. If the value under examination does need to be homomorphically encrypted 610, the HEDO client may determine whether a deterministic homomorphic encryption is available 612. If a deterministic homomorphic encryption is available, the value may be encrypted using such a scheme 613. If deterministic homomorphic encryption is not available, the HEDO client may determine whether a nondeterministic homomorphic encryption is available 615. If no such nondeterministic homomorphic encryption is available the client may return a storage encryption error 616. If a nondeterministic homomorphic encryption is available 615, the HEDO client may determine if there is a unitary key used for nondeterministic encryption. If a unitary key is used the HEDO client will load the key 618 and encrypt the values using the unitary key 619. If the unitary key is not used for nondeterministic homomorphic encryption 617, the HEDO client may determine if a previously created grouping key can be used to encrypt the extracted values 620. If a previously used grouping key is not available 621, a new grouping key may be created 622. In some embodiments, the grouping key may be forwarded to an HEDO client database for storage. In other embodiments, the grouping key may be stored by the HEDO server, the HEDO repository, the merchant transaction server, and/or the like. In still other embodiments, the grouping key may be supplemented with metadata such as but not limited to, the table, the fields, and/or the range of values that the grouping key encrypts. In so doing, the HEDO may later utilize the grouping key in performing homomorphic joins, homomorphic aggregation, and/or other homomorphic operations. Once a grouping key is obtained, in some embodiments, the extracted values may be encrypted using the grouping key 623. If more values are unprocessed 614, the procedure may repeat, otherwise the procedure may terminate.

FIGS. 7A-G show example user interfaces illustrating aspects of the HEDO, in one implementation of the HEDO operation. In one embodiment, the HEDO user interface 701a, allows merchants to easily perform useful queries against the HEDO database without having access to the underlying data values. In one embodiment, a merchant may desire to detect fraud, e.g. 701b, and may define fraud as multiple purchases made by the same cardholder at the same merchant type with cards from multiple issuers. In other embodiments, the merchant may desire to compare its known customers' transactions to those transactions its customers make at the merchants competitors, 701c. In still other embodiments, the merchant may desire to know how the risk levels associated with its customers compare to those of the customers of its competitors, 701d.

Figure 7B:
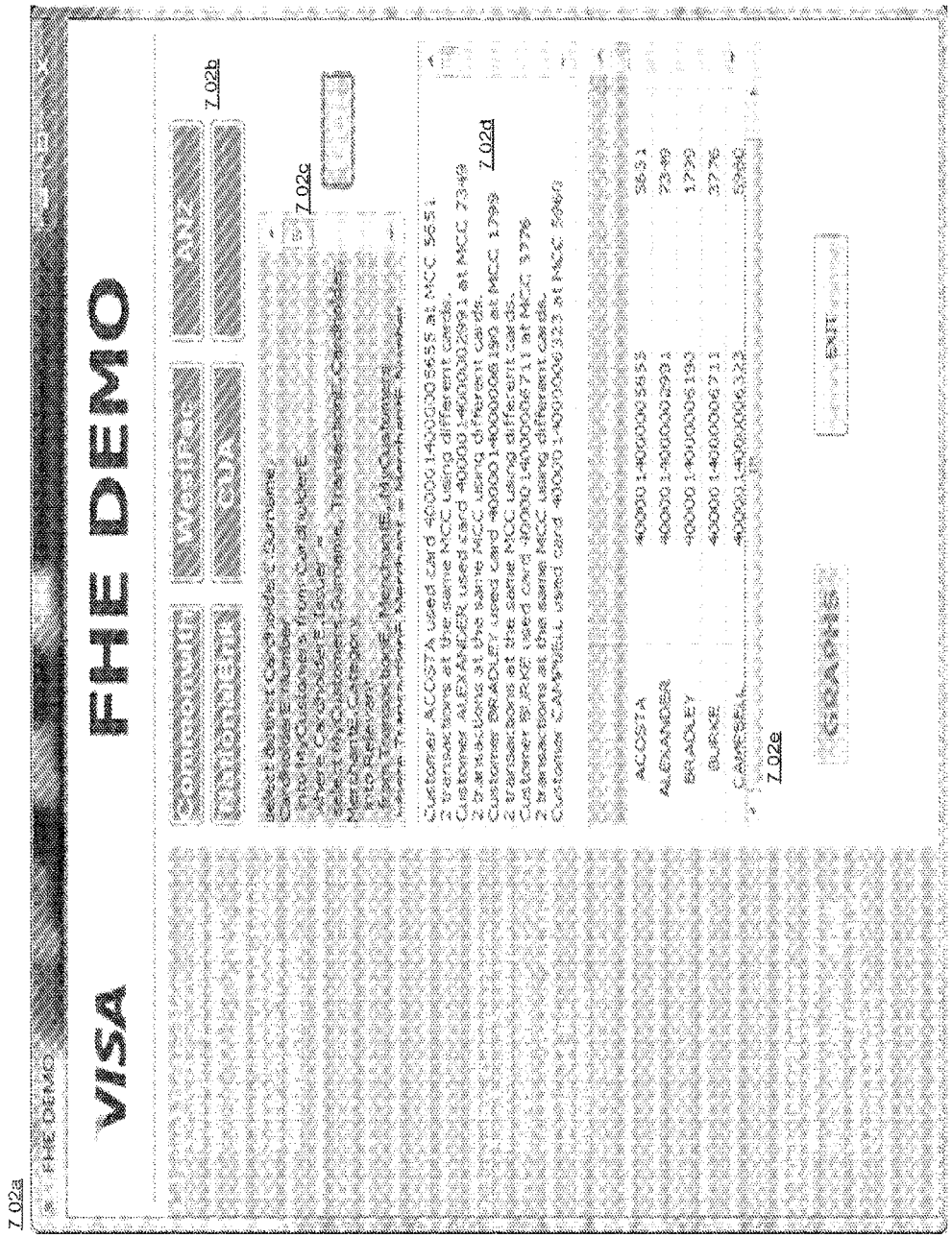

With respect to FIG. 7B, and HEDO user interface, e.g. 702a, may be presented for fraud detection. In one embodiment, competitors of the merchant may be displayed 702b as well as a SQL-like query 702c that allows a merchant to specify an issuer for which to determine levels of fraud. In other embodiments, other entities such as the issuer themselves, a consumer and/or the like may utilize the query facilities. In one embodiment, the results of the query are displayed 702d and show instances where customers utilize different cards to engage in transactions with merchants of the same type. In still other embodiments, a table may be displayed containing the customer's last name, the card number used, as well as the MCC code for the suspected fraud.

Figure 7C:
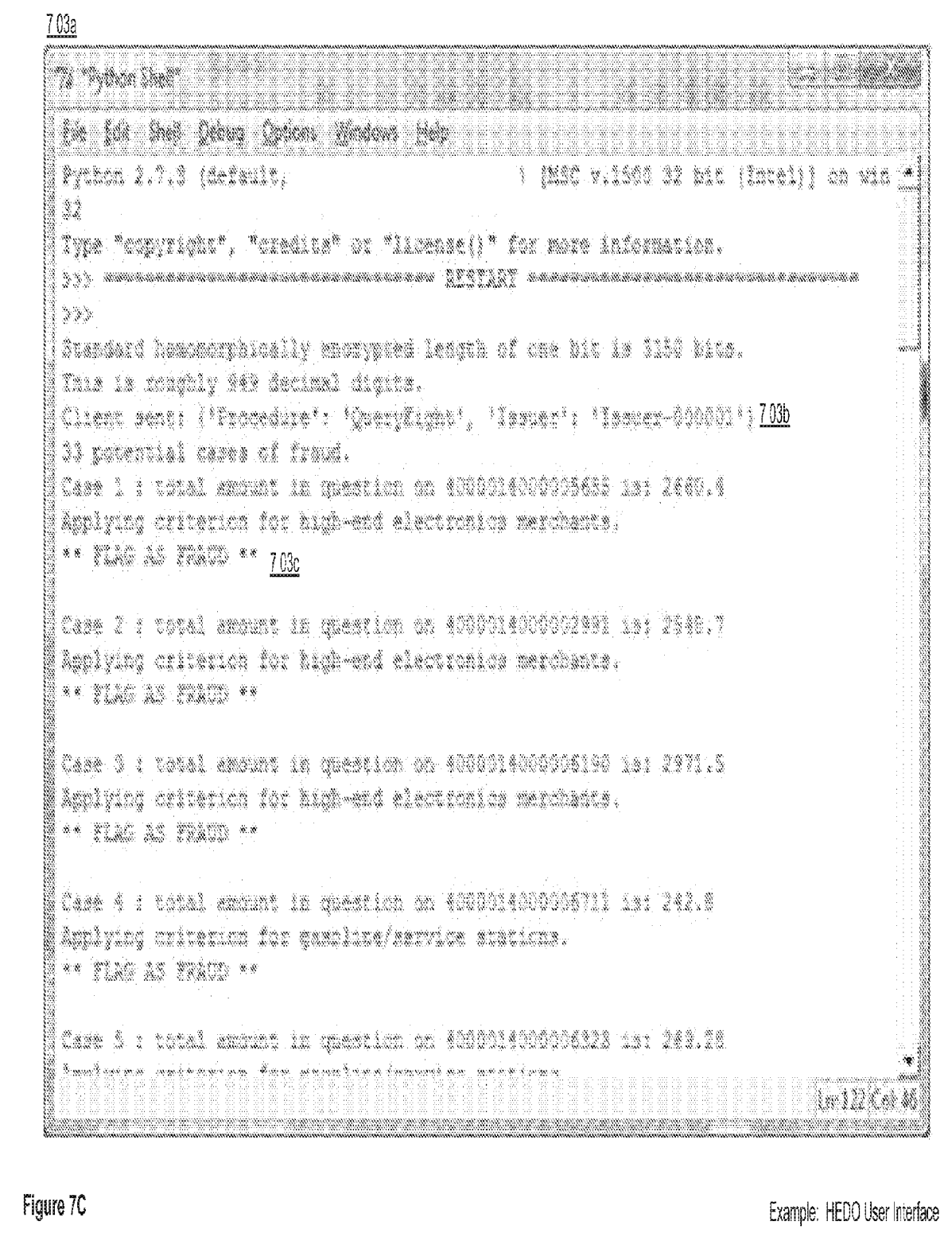

With respect to FIG. 7C, an HEDO user interface 703a may display incremental progress as the HEDO server queries the HEDO database. In one embodiment, the client inputs such as which query to execute, which issuer to query for, and/or the like, e.g., 703*b*, may be displayed. In other embodiments, differing criterion such as that for a high-end retailer of electronics merchandise may be applied and matching results displayed 703*c*.

Figure 7D:
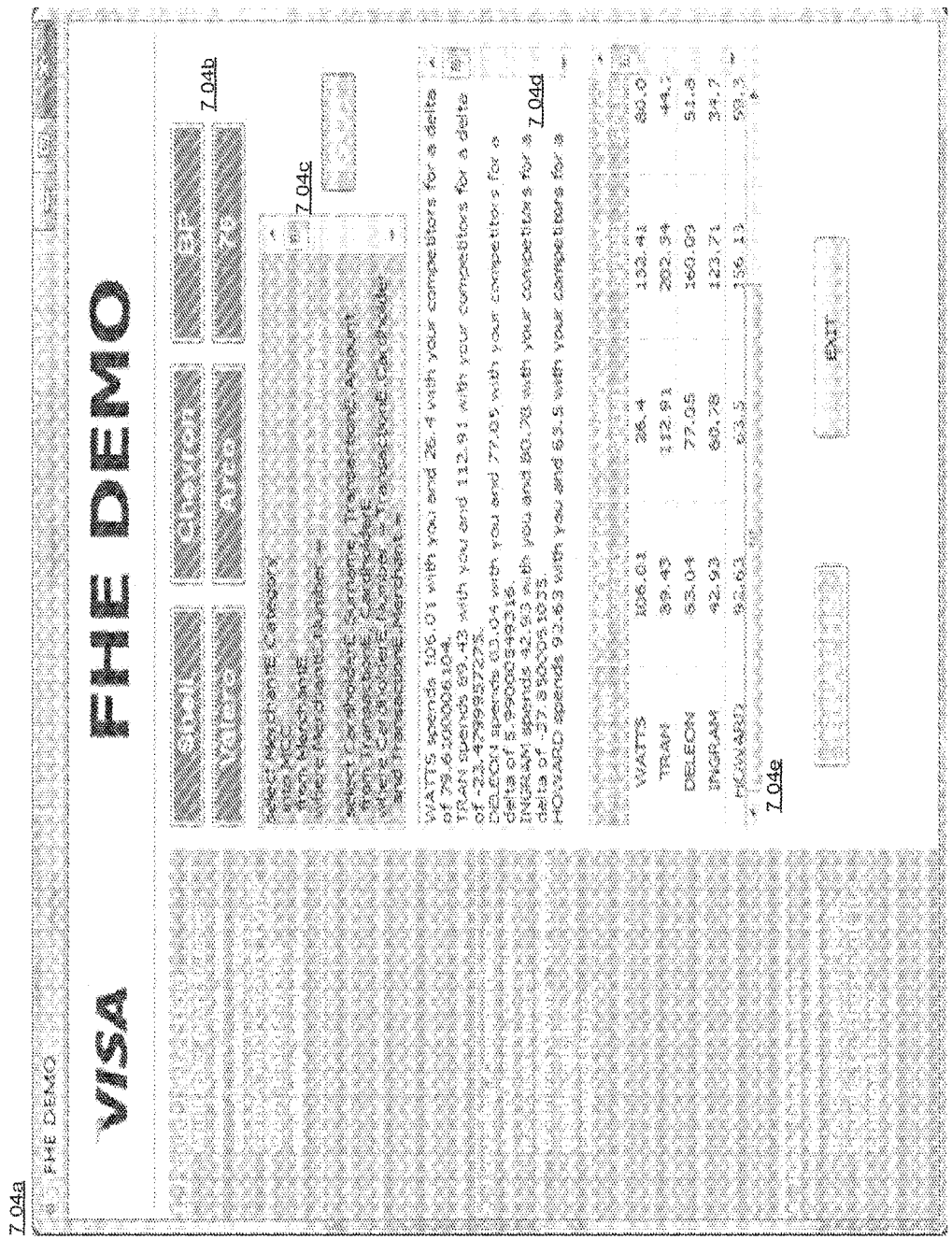

With respect to FIG. 7D, the HEDO user interface 704*a*, may be utilized to perform a consumer loyalty comparison for a merchant against other merchants in a cohort. In one embodiment, competitors of the merchant may be displayed 704*b*, as well as two queries 704*c*. In the first query, the merchant may desire to determine their own loyalty score. In one embodiment, in a second query the merchant may desire to determine customer loyalty for its customers that shop at the merchant's competitors. In such cases, the merchant may not have access to the direct underlying transaction amount values for the purchases its customers make at competing merchants. In one embodiment, customer names as well as spend amounts with both the merchant and the merchant competitors may be displayed 704*d*. In some embodiments, a table may be used to compare, by customer, the merchant spend, market spend, total spend, and/or the like 704*e*.

Figure 7E:
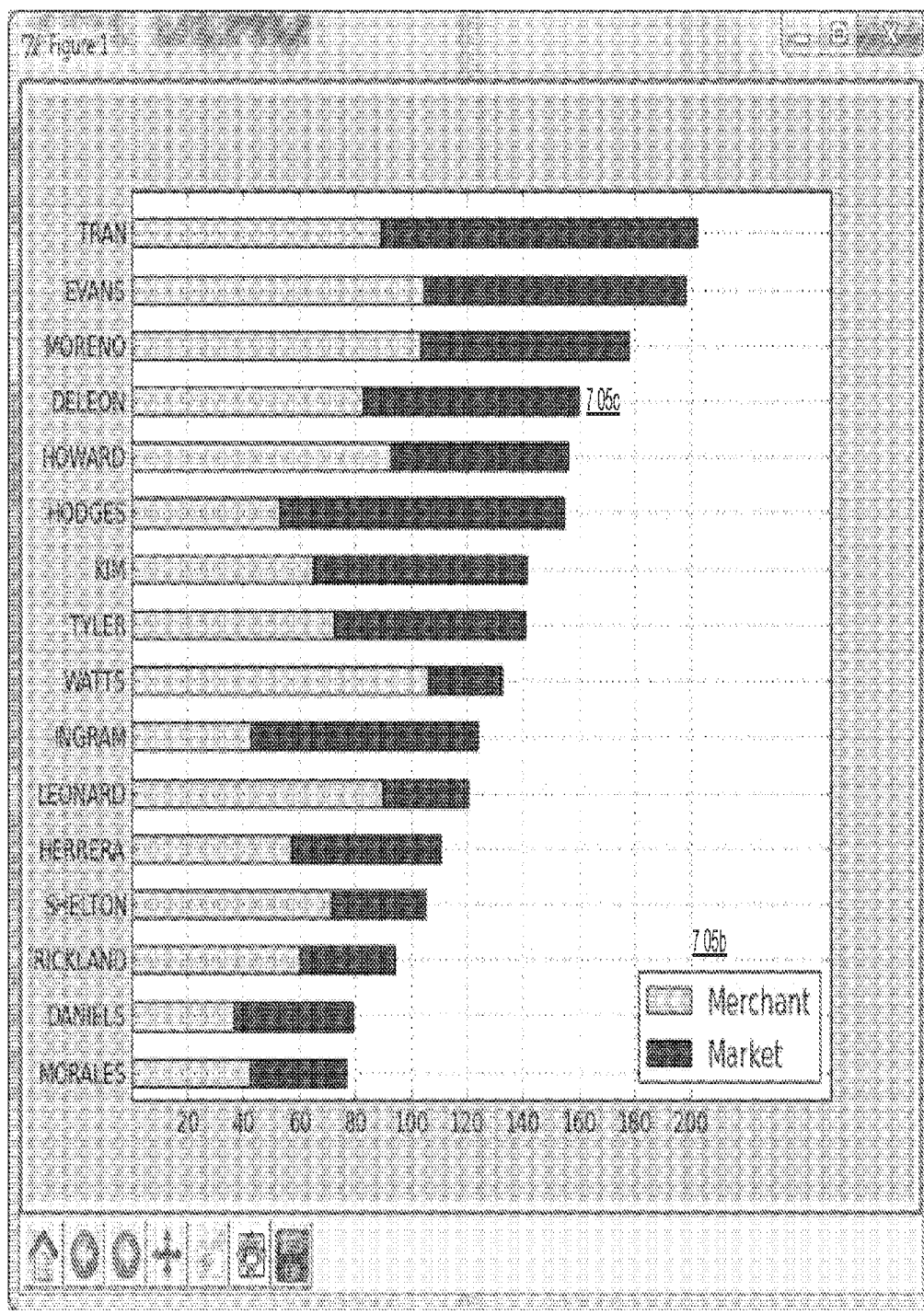

With respect to FIG. 7E, in some embodiments, the HEDO user interface 705*a* may display a graphical representation that charts consumer loyalty between the merchant and the market as a whole, e.g., 705*b*. The market in this case being defined as identified competitors of the merchant in question. A relative value of an individual consumer's loyalty to the merchant and to the merchant's competitors may be shown by dividing an aggregate spend representation into multiple sections, e.g. 705*c*.

Figure 7F:
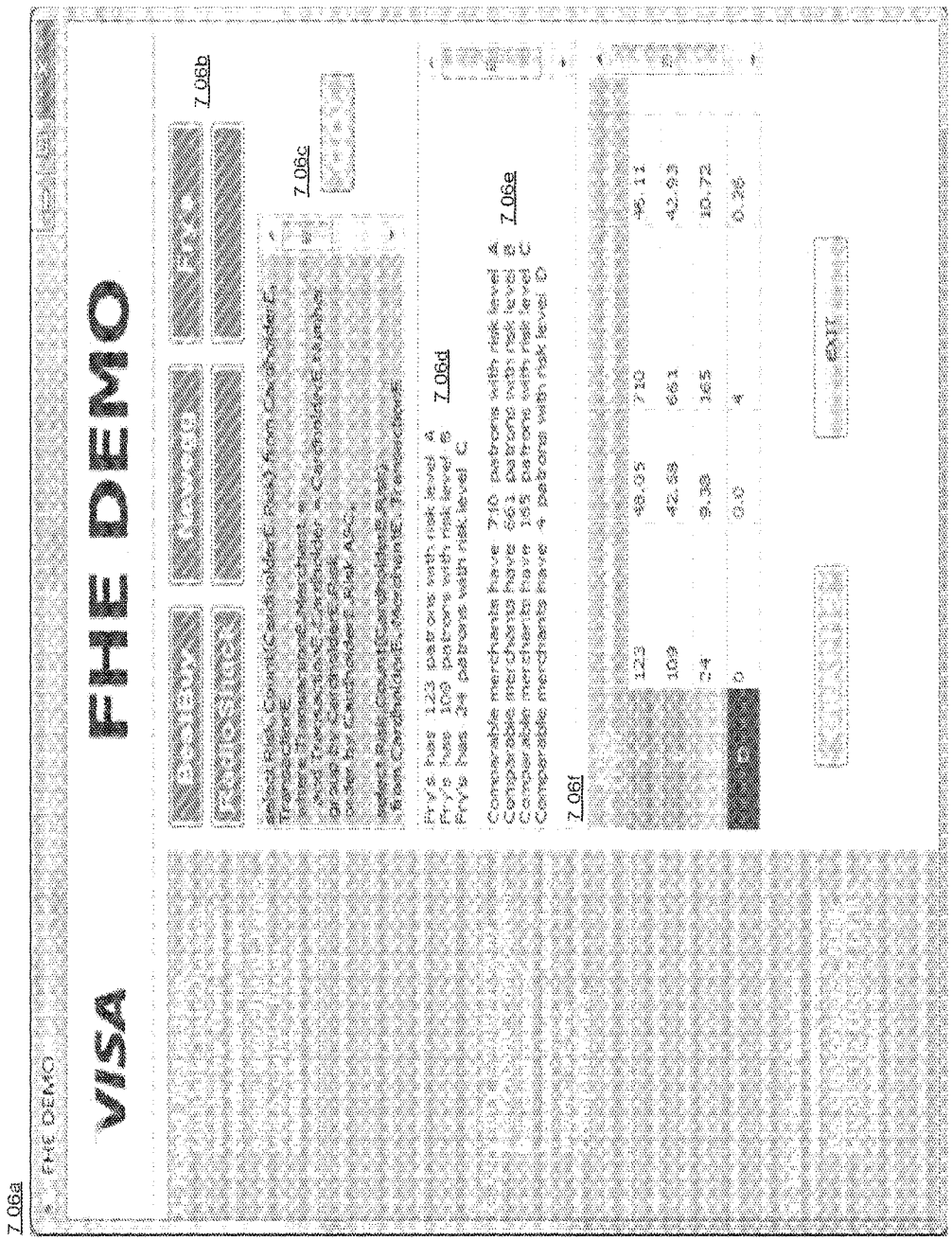

With respect to FIG. 7F, the HEDO user interface 706*a* may be utilized by a merchant to compare the merchant's customer risk level to the customer risk level of its competitors. This comparison may be performed by the HEDO server and database without exposing underlying encrypted data to the merchant, and while performing operations on stored encrypted data itself. In one embodiment, competitors of the merchant may be selected 706*b* and two queries may be created 706*c*. In the first query the merchant may desire to learn its risk level. In the second query, the risk level associated with the comparison group may be selected and returned. In one embodiment, a merchant may receive a listing of risk levels and the number of its customers at the given risk level 706*d*. In some embodiments, similar summary data regarding risk levels and customer accounts may be displayed for the comparison merchant group 706*e*. In some embodiments, a table may be used to chart risk levels of the merchant and the comparison group, e.g., 706*f*.

With respect to FIG. 7G, the HEDO user interface 707*a* may display a graphical representation comparing risk levels for a merchant and market. Percentile values may be graphed for each risk level for both the merchant and the market, e.g. 707*b*.

HEDO Controller

Figure 8:
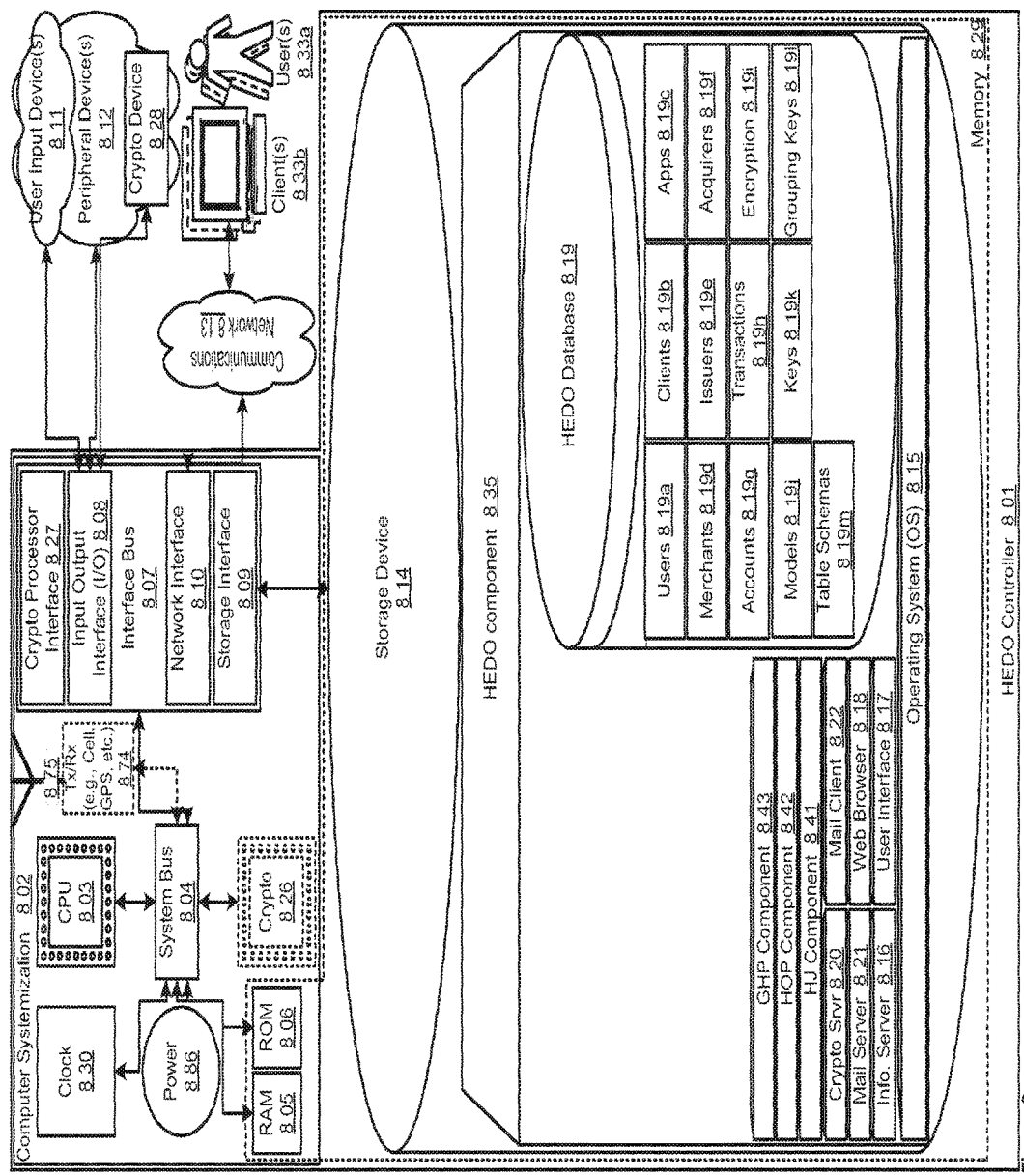
FIG. 8 shows a block diagram illustrating aspects of an exemplary embodiment of a HEDO user interface controller, in one implementation of the HEDO operation.

FIG. 8 shows a block diagram illustrating embodiments of a HEDO controller. In this embodiment, the HEDO controller 801 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 803 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the HEDO controller 801 may be connected to and/or communicate with entities such as, but not limited to: one or more users from user input devices 811; peripheral devices 812; an optional cryptographic processor device 828; and/or a communications network 813.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The HEDO controller 801 may be based on computer systems that may comprise, but are not limited to, components such as: a computer systemization 802 connected to memory 829.

Computer Systemization

A computer systemization 802 may comprise a clock 830, central processing unit ("CPU(s)" and/or "processor(s)"

(these terms are used interchangeable throughout the disclosure unless noted to the contrary)) 803, a memory 829 (e.g., a read only memory (ROM) 806, a random access memory (RAM) 805, etc.), and/or an interface bus 807, and most frequently, although not necessarily, are all interconnected and/or communicating through a system bus 804 on one or more (mother)board(s) 802 having conductive and/or otherwise transportive circuit pathways through which instructions (e.g., binary encoded signals) may travel to effectuate communications, operations, storage, etc. The computer systemization may be connected to a power source 886; e.g., optionally the power source may be internal. Optionally, a cryptographic processor 826 and/or transceivers (e.g., ICs) 874 may be connected to the system bus. In another embodiment, the cryptographic processor and/or transceivers may be connected as either internal and/or external peripheral devices 812 via the interface bus I/O. In turn, the transceivers may be connected to antenna(s) 875, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing HEDO controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 829 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the HEDO controller and beyond through various interfaces. Should processing requirements dictate a greater amount speed and/or capacity, distributed processors (e.g., Distributed HEDO), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the HEDO may be achieved by implementing a microcontroller such as CAST's R8051XC2 microcontroller; Intel's MCS 51 (i.e., 8051 microcontroller); and/or the like. Also, to implement certain features of the HEDO, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the HEDO component collection (distributed or otherwise) and/or features may be implemented via the microprocessor and/or via embedded components; e.g., via ASIC, coprocessor, DSP, FPGA, and/or the like. Alternately, some implementations of the HEDO may be implemented with embedded components that are configured and used to achieve a variety of features or signal processing.

Depending on the particular implementation, the embedded components may include software solutions, hardware solutions, and/or some combination of both hardware/software solutions. For example, HEDO features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the HEDO features. A hierarchy of programmable interconnects allow logic blocks to be interconnected as needed by the HEDO system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the HEDO may be developed on regular FPGAs and then migrated into a fixed version that more resembles ASIC implementations. Alternate or coordinating implementations may migrate HEDO controller features to a final ASIC instead of or in addition to FPGAs. Depending on the implementation all of the aforementioned embedded components and microprocessors may be considered the "CPU" and/or "processor" for the HEDO.

Power Source

The power source 886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 886 is connected to at least one of the interconnected subsequent components of the HEDO thereby providing an electric current to all subsequent components. In one example, the power source 886 is connected to the system bus component 804. In an alternative embodiment, an outside power source 886 is provided through a connection across the I/O 808 interface. For example, a USB and/or IEEE 1394 connection carries both data and power across the connection and is therefore a suitable source of power.

Interface Adapters

Interface bus(ses) 807 may accept, connect, and/or communicate to a number of interface adapters, conventionally although not necessarily in the form of adapter cards, such as but not limited to: input output interfaces (I/O) 808, storage interfaces 809, network interfaces 810, and/or the like. Optionally, cryptographic processor interfaces 827 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 809 may accept, communicate, and/or connect to a number of storage devices such as, but not limited to: storage devices 814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 810 may accept, communicate, and/or connect to a communications network 813. Through a communications network 813, the HEDO controller is accessible through remote clients 833*b* (e.g., computers with web browsers) by users 833*a*. Network interfaces may employ connection protocols such as, but not limited to: direct connect, Ethernet (thick, thin, twisted pair 10/100/1000Base T, and/or the like), Token Ring, wireless connection such as IEEE 802.11a-x, and/or the like. Should processing requirements dictate a greater amount speed and/or capacity, distributed network controllers (e.g., Distributed HEDO), architectures may similarly be employed to pool, load balance, and/or otherwise increase the communicative bandwidth required by the HEDO controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 810 may be used to engage with various communications network types 813. For example, multiple network interfaces may be employed to allow for the communication over broadcast, multicast, and/or unicast networks.

Input Output interfaces (I/O) 808 may accept, communicate, and/or connect to user input devices 811, peripheral devices 812, cryptographic processor devices 828, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 811 often are a type of peripheral device 512 (see below) and may include: card readers, dongles, finger print readers, gloves, graphics tablets, a joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 812 may be connected and/or communicate to I/O and/or other facilities of the like such as network interfaces, storage interfaces, directly to the interface bus, system bus, the CPU, and/or the like. Peripheral devices may be external, internal and/or part of the HEDO controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the HEDO controller may be embodied as an embedded, dedicated, and/or monitor-less (i.e., headless) device, wherein access would be provided over a network interface connection.

Cryptographic units such as, but not limited to, microcontrollers, processors 826, interfaces 827, and/or devices 828 may be attached, and/or communicate with the HEDO controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 829. However, memory is a fungible technology and resource, thus, any number of memory embodiments may be employed in lieu of or in concert with one another. It is to be understood that the HEDO controller and/or a computer systemization may employ various forms of memory 829. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 829 will include ROM 806, RAM 805, and a storage device 814. A storage device 814 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 829 may contain a collection of program and/or database components and/or data such as, but not limited to: operating system component(s) 815 (operating system); information server component(s) 816 (information server); user interface component(s) 817 (user interface); Web browser component(s) 818 (Web browser); database(s) 819; mail server component(s) 821; mail client component(s) 822; cryptographic server component(s) 820 (cryptographic server); the HEDO component(s) 835; HJ Component 841; HOP Component 842; GHP Component 843; and/or the like (i.e., collectively a component collection). These components may be stored and accessed from the storage devices and/or from storage devices accessible through an interface bus. Although non-conventional program components such as those in the component collection, typically, are stored in a local storage device 814, they may also be loaded and/or stored in memory such as: peripheral devices, RAM, remote storage facilities through a communications network, ROM, various forms of memory, and/or the like.

Operating System

The operating system component 815 is an executable program component facilitating the operation of the HEDO controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP/Win7 (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the HEDO controller to communicate with other entities through a communications network 813. Various communication protocols may be used by the HEDO controller as a subcarrier transport mechanism for interaction, such as, but not limited to: multicast, TCP/IP, UDP, unicast, and/or the like.

Information Server

An information server component 816 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HITPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTTP request is resolved to a particular information server, the information server resolves requests for information at specified locations on the HEDO controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the HEDO database 819, operating systems, other program components, user interfaces, Web browsers, and/or the like.

Access to the HEDO database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the HEDO. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the HEDO as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 817 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 818 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Firefox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the HEDO enabled nodes. The combined application may be nugatory on systems employing standard Web browsers.

Mail Server

A mail server component 821 is a stored program component that is executed by a CPU 803. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the HEDO.

Access to the HEDO mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 822 is a stored program component that is executed by a CPU 803. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 820 is a stored program component that is executed by a CPU 803, cryptographic processor 826, cryptographic processor interface 827, cryptographic processor device 828, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HITPS), and/or the like. Employing such encryption security protocols, the HEDO may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the HEDO component to engage in secure transactions if so desired. The cryptographic component facilitates the secure accessing of resources on the HEDO and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The HEDO Database

The HEDO database component 819 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the HEDO database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the HEDO database is implemented as a data-structure, the use of the HEDO database 819 may be integrated into another component such as the HEDO component 835. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 819 includes several tables 819a-m. A Users table 819a may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a HEDO. A Clients table 819b may include fields such as, but not limited to: client_id, client_name, client_ip, client_type, client_model, operating_system, os_version, app_installed_flag, and/or the like. An Apps table 819c may include fields such as, but not limited to: app_id, app_name, app_type, os_compatibilities_list, version, timestamp, developer_id, and/or the like. A Merchants table 819d may include fields such as, but not limited to: merchant_id, merchant_name, merchant_address, ip_address, mac_address, auth_key, port_num, security_settings_list, and/or the like. An Issuers table 819e may include fields such as, but not limited to: issuer_id, issuer_name, issuer_address, ip_address, mac_address, auth_key, port_num, security_settings_list, and/or the like. An Acquirers table 819f may include fields such as, but not limited to: acquirer_id, acquirer_name, acquirer_gateway_id, issuer_aquirer_flag, institution_name, and/or the like. An Accounts table 819g may include fields such as, but not limited to: account_id, account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Transactions table 819h may include fields such as, but not limited to: transaction_id, user_id, timestamp, transaction_cost, purchase_details_list, num_products, products_list, product_type, product_params_list, product_title, product_summary, quantity, account_firstname, account_lastname, account_type, account_num, billingaddress_line1, billingaddress_line2, billing_zipcode, billing_state, shipping_preferences, shippingaddress_line1, shippingaddress_line2, shipping_zipcode, shipping_state, merchant_id, merchant_name, merchant_auth_key, and/or the like. An Encryption table 819i may include fields such as, but not limited to: encryption_id, encryption_scheme, encryption_method, salt_value, key_ids, and/or the like. A Models table 819j may include fields such as, but not limited to: model_id, model_name, user_id, issuer_id, merchant_id, model_description, model_commands, and/or the like. A Keys table 819k may include fields such as, but not limited to: key_id, key_decrypts_record pointer, generated_date, owned_by_id, user_id, acquirer_id, merchant_id, server_identifier, key_expiration, and/or the like. A Grouping Keys table 819l may include fields such as, but not limited to: grouping_key_id, sub_key_of_key_id, key_id, description, server_identifier, table_id, table_names, table_grouping_fields, table_grouping_rangees, and/or the like. A Table Schemas table 819m may include fields such as, but not limited to: table_schema_id, server_identifier, table_names, table_structure, grouping_method, table_encrypted_values, table_encrypted_value_methods, and/or the like.

In one embodiment, the HEDO database may interact with other database systems. For example, employing a distributed database system, queries and data access by search HEDO component may treat the combination of the HEDO database, an integrated data security layer database as a single database entity.

In one embodiment, user programs may contain various user interface primitives, which may serve to update the HEDO. Also, various accounts may require custom database tables depending upon the environments and the types of clients the HEDO may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 819a-m. The HEDO may be configured to keep track of various settings, inputs, and parameters via database controllers.

The HEDO database may communicate to and/or with other components in a component collection, including itself, and/or facilities of the like. Most frequently, the HEDO database communicates with the HEDO component, other program components, and/or the like. The database may contain, retain, and provide information regarding other nodes and data.

The HEDOs

The HEDO component 835 is a stored program component that is executed by a CPU. In one embodiment, the HEDO component incorporates any and/or all combinations of the aspects of the HEDO that was discussed in the previous figures. As such, the HEDO affects accessing, obtaining and the provision of information, services, transactions, and/or the like across various communications networks. The features and embodiments of the HEDO discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the HEDO's features and facilities, and in many cases reduce the costs, energy consumption/requirements, and extend the life of HEDO's underlying infrastructure; this has the added benefit of making the HEDO more reliable. Similarly, many of the features and mechanisms are designed to be easier for users to use and access, thereby broadening the audience that may enjoy/employ and exploit the feature sets of the HEDO; such ease of use also helps to increase the reliability of the HEDO. In addition, the feature sets include heightened security as noted via the Cryptographic components 820, 826, 828 and throughout, making access to the features and data more reliable and secure.

The HEDO component may transform transaction storage requests and model query requests, and/or the like and use the HEDO. In one embodiment, the HEDO component 835 takes inputs (e.g., transaction storage request 203a, 203b, HEDO package storage request 208, homomorphic insertion 212, model query request 303, request grouping keys 306, HEDO model query request 309, HEDO query 312 and/or the like) etc., and transforms the inputs via various components (e.g., HJ Component 841; HOP Component 842; GHP Component 843, and/or the like), into outputs (e.g., HEDO results response 317, HEDO model query results 319, receive grouping keys 308, model query response 321, render model query output 322, and/or the like).

The HEDO component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the HEDO server employs a cryptographic server to encrypt and decrypt communications. The HEDO component may communicate to and/or with other components in a component collection, including itself, and/or facilities of the like. Most frequently, the HEDO component communicates with the HEDO database, operating systems, other program components, and/or the like. The HEDO may contain, communicate, generate, obtain, and/or provide program component, system, user, and/or data communications, requests, and/or responses.

Distributed HEDOs

The structure and/or operation of any of the HEDO node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the HEDO controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the HEDO controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
//set ip address and port to listen to for incoming data
$address = '192.168.0.100';
$port = 255;
//create a server-side SSL socket, listen
//for/accept incoming communication
$sock = socket_create(AF_INET, SOCK_STREAM, 0);
socket_bind($sock, $address, $port)
    or die('Could not bind to address');
socket_listen($sock);
$client = socket_accept($sock);
//read input data from client device in 1024 byte
//blocks until end of message
do {
        $input = "";
        $input = socket_read($client, 1024);
        $data .= $input;
} while($input != "");
// parse data to extract variables
$obj = json_decode($data, true);
// store input data in a database
mysql_connect("10.1.1.1",$srvr,$pass); // access database server
mysql_select("CLIENT_DB.SQL"); // select database to append
mysql_query("INSERT INTO UserTable (transmission) VALUES
($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?
topic=/com.ibm.IBMDI.doc/referenceguide295.htm
and other parser implementations:
http://publib.boulder.ibm.com/infocenter/tivihelp/v2r1/index.jsp?
topic=/com.ibm.IBMDI.doc/referenceguide259.htm
all of which are hereby expressly incorporated by reference.

In order to address various issues and advance the art, the entirety of this application for HEDO (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a HEDO individual and/or enterprise user, database configuration and/or relational model, data type, data transmission and/or network framework, syntax structure, and/or the like, various embodiments of the HEDO, may be implemented that enable a great deal of flexibility and customization. For example, aspects of the HEDO may be adapted for restaurant dining, online shopping, brick-and-mortar shopping, secured information processing, and/or the like. While various embodiments and discussions of the HEDO have been directed to electronic purchase transactions, however, it is to be understood that the embodiments described herein may be readily configured and/or customized for a wide variety of other applications and/or implementations.

Figure 9:
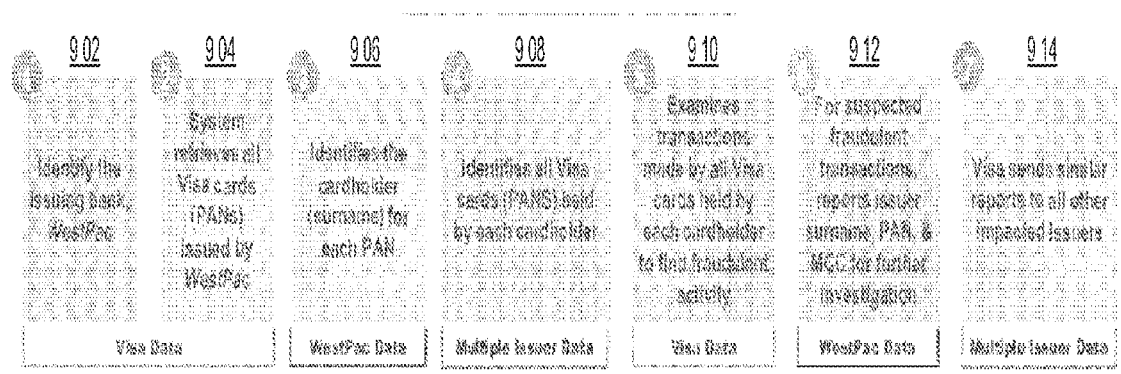
Figure 10:
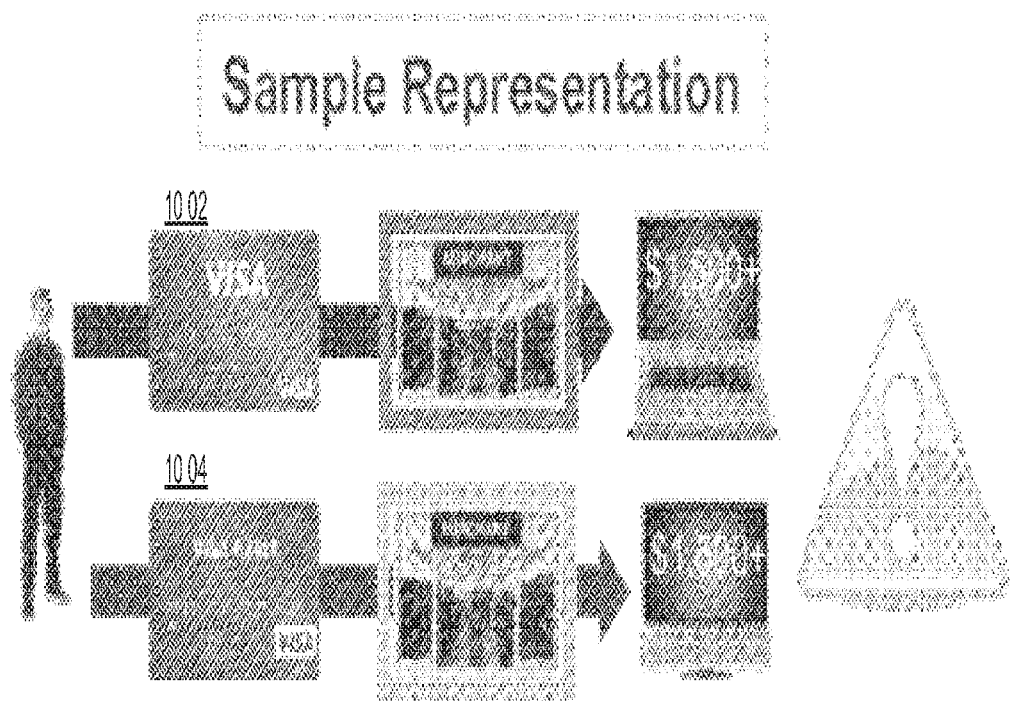

As additional examples of the wide scope of the systems and methods disclosed herein, the following example illustrates a fraud scenario. In this example, multiple purchases were made by the same cardholder at the same merchant type (MCC) with cards for multiple issuers. Merchant types were either gasoline/service stations or high-end electronics. Ticket value was $1500 plus for high-end electronics and $200 plus for gasoline. FIG. 9 shows an example of targeting fraud using HEDO operations. At step 902, the issuing bank is identified by data collected by Visa. The system retrieves all Visa cards (PANs) issued by the issuing bank at step 904. At step 906, the cardholder is identified for each PAN, and all Visa cards held by each cardholder is identified at step 908. Step 910 examines transactions made by all Visa cards held by each cardholder to find fraudulent activity. For suspected fraudulent transactions, step 912 reports issuer surname, PAN, and MCC for further investigation. At step 914, Visa sends similar reports to all other impacted issuers. FIG. 10 depicts a sample representation involving a Visa credit card 1002 and a Visa debit card 1004 that are being handled by merchants. An alert symbol is provided for any identified issues.

It should be understood that different or additional embodiments can be considered in such examples. For example, in one embodiment, the systems and methods may use live data including timestamps to add another dimension of analysis. As another example, multi-party agreements may enable account-level analysis, rather than only at the PAN or surname level.

Other embodiments include multiple public/private keys being required and/or multiple encryption schemes being used. Software/hardware optimizations can also be used with fully homomorphic encryption. In another embodiment, multi-party relationships can be used to harness the benefits of aggregate data. Still further, the systems and methods disclosed herein can run on modeled data, not live data. In another embodiment, the model strives to encapsulate reality and contains key domain knowledge. Additionally, if fully homomorphic encryption takes an excessively long time to compute, then somewhat homomorphic encryption can be used as described in Appendix A of the following application: U.S. provisional patent application Ser. No. 61/861,368, filed Aug. 1, 2013, 532US01, entitled "Homomorphic Database Operations Apparatuses, Methods and Systems," which is expressly incorporated herein by reference.

Figure 11:
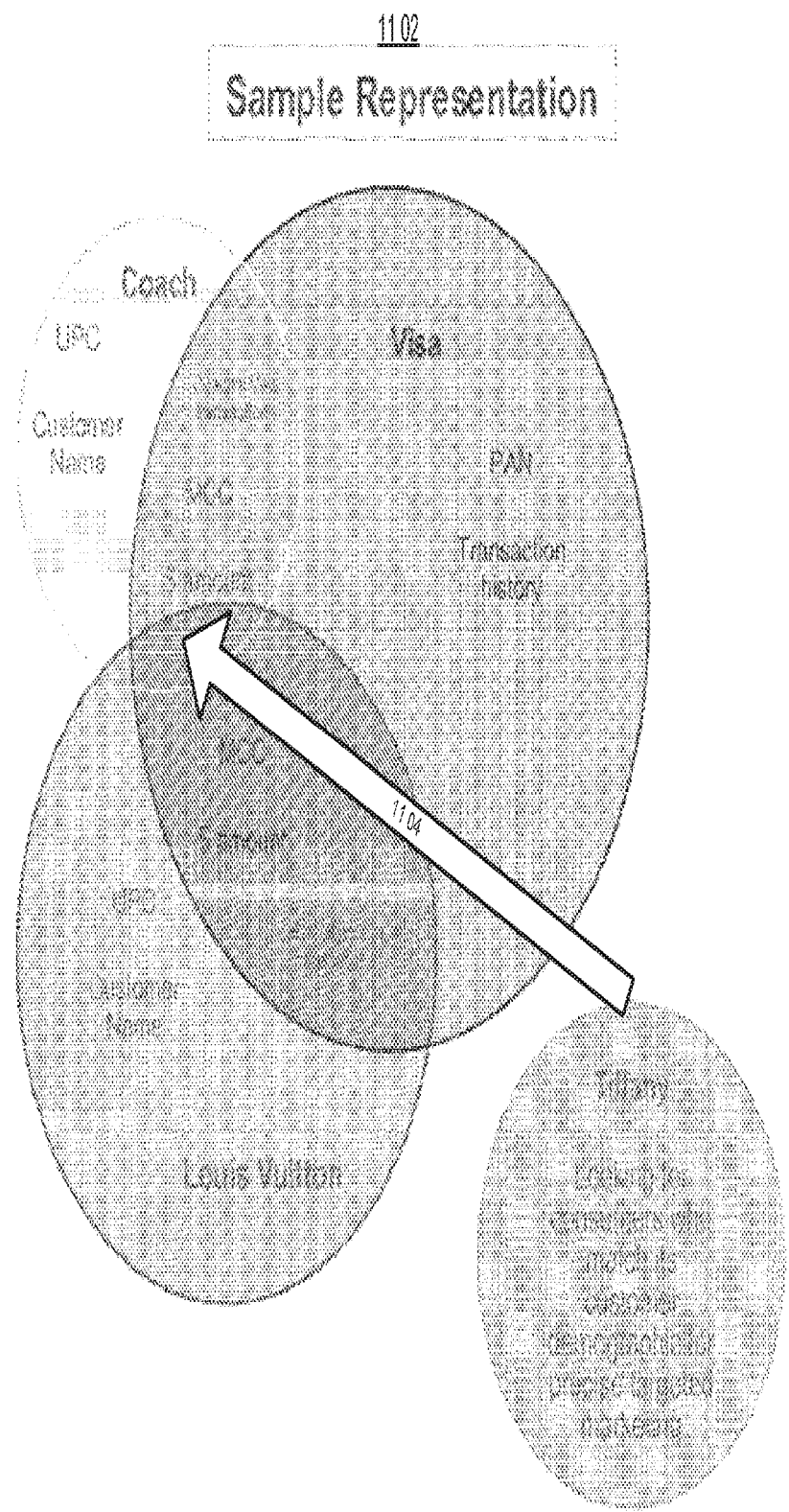

As another example, HEDO operations can also be used with customer acquisition. In one scenario, the merchant may be looking for consumers who match its customer demographics by querying transactions made by related merchants. As an example, FIG. 11 illustrates at 1102 analysis involving "Tiffany" offering a new sterling silver tag that it wishes to market to frequent purchasers of coach and/or Louis Vuitton handbags. The analysis using HEDO operations identifies such customers at region 1104. This can optimize the merchant's marketing dollars by developing precise marketing campaigns to reach new customers who are in the merchant's exact target market. Product-level data can also be incorporated in the analysis. Because of such operations, Visa can provide the conduit for the offer without revealing private customer information. Also, targeted customers could opt-in to the Visa offers program.

Other embodiments involving HEDO operations can include (Dis-)Loyalty scenarios. As an illustration, a merchant can compare its customers' transactions with those made at its competitors. Analysis involving HEDO operations can assess which customers are the most valuable to the target with marketing campaigns to convert to higher transactions versus loyal customers to the company or to its competitors. Reports based upon such analysis can be generated including the graphical report and comparison shown in FIG. 12 at 1202. In one embodiment, information may be made more useful with product-level data rather than with only ticket values. Additionally, implementations using live data could include timestamps and geo-location to further assist in precise targeting.

What is claimed is:

1. An encrypted table value homomorphically joining apparatus, comprising:
   a memory; and
   a processor disposed in communication with said memory, and configured to issue a plurality of processing instructions stored in the memory, wherein the processor issues instructions to:
   receive a model query for processing, wherein the model query requires data values from more than one table in a data repository;
   based on the model query, determine a join type to perform, a plurality of tables to be joined, and a plurality of fields on which to join the plurality of tables;
   determine that the plurality of fields on which to join includes at least one field that contains homomorphically encrypted data;
   determine a homomorphic join strategy;
   perform a homomorphic join using the plurality of fields; and
   provide the resultant homomorphically joined tables,
   wherein the homomorphic join strategy is directly comparing values in two homomorphically encrypted fields.

2. The apparatus of claim 1, wherein the processor further issues instructions to:
   analyze the resultant homomorphically joined tables to determine that at least one record in the resultant homomorphically joined tables requires further processing; and
   determine that the at least one record in the resultant homomorphically joined tables contains homomorphically encrypted data.

3. The apparatus of claim 2, wherein the processor further issues instructions to perform a homomorphically optimized addition function to add the homomorphically encrypted data values contained in the at least one record.

4. The apparatus of claim 1, wherein the homomorphic join strategy is using a key common to all values in at least one of the plurality of fields to decrypt the plurality of homomorphically encrypted values in a field.

5. The apparatus of claim 1, wherein when the homomorphic join strategy is to utilize grouping keys, additionally comprising instructions to:
   receive a plurality of grouping keys;
   determine a plurality of ranges of field values that each grouping key may be used to decrypt; and
   decrypt each of the field values in each of the ranges using the grouping keys.

6. The apparatus of claim 1, additionally comprising instructions to aggregate results from the resultant homomorphically joined tables.

7. The apparatus of claim 6, wherein aggregating involves leaving encrypted space and re-entering the encrypted space.

8. The apparatus of claim 6, wherein the aggregation is performed completely in encrypted space.

9. A processor implemented method of homomorphically joining repository tables using encrypted table values, comprising:
   receiving, using one or more data processors, a model query for processing, wherein the model query requires data values from more than one table in a data repository;
   based on the model query, determining, using the one or more data processors, a join type to perform, a plurality of tables to be joined, and a plurality of fields on which to join the plurality of tables;
   determining, using the one or more data processors, that the plurality of fields on which to join includes at least one field that contains homomorphically encrypted data;
   determining a homomorphic join strategy;
   performing, using the one or more data processors, a homomorphic join using the plurality of fields; and
   providing, using the one or more data processors, the resultant homomorphically joined tables,
   wherein the homomorphic join strategy is directly comparing values in two homomorphically encrypted fields.

10. The method of claim 9, further comprising:
analyzing the resultant homomorphically joined tables to determine that at least one record in the resultant homomorphically joined tables requires further processing; and
determining that the at least one record in the resultant homomorphically joined tables contains homomorphically encrypted data.

11. The method of claim 10, wherein the processor further issues instructions to perform a homomorphically optimized addition function to add the homomorphically encrypted data values contained in the at least one record.

12. The method of claim 9, wherein the homomorphic join strategy is using a key common to all values in at least one of the plurality of fields to decrypt the plurality of homomorphically encrypted values in a field.

13. The method of claim 9, wherein when the homomorphic join strategy is to utilize grouping keys, additionally comprising:
receiving a plurality of grouping keys;
determining a plurality of ranges of field values that each grouping key may be used to decrypt; and
decrypting each of the field values in each of the ranges using the grouping keys.

14. The method of claim 9, additionally comprising aggregating results from the resultant homomorphically joined tables.

15. The method of claim 14, wherein aggregating involves leaving encrypted space and re-entering the encrypted space.

16. The method of claim 14, wherein the aggregation is performed completely in encrypted space.

17. A non-transitory computer readable medium storing instructions that, when executed, cause an apparatus at least to perform:
receiving model query for processing, wherein the model query requires data values from more than one table in a data repository;
based on the model query a join type to perform, a plurality of tables to be joined, and a plurality of fields on which to join the plurality of tables;
determining that the plurality of fields on which to join includes at least one field that contains homomorphically encrypted data;
determining a homomorphic join strategy;
performing a homomorphic join using the plurality of fields; and
providing the resultant homomorphically joined tables,
wherein the homomorphic join strategy is directly comparing values in two homomorphically encrypted fields.

18. The non-transitory computer readable medium of claim 17 further comprising instructions causing the apparatus to perform:
analyzing the resultant homomorphically joined tables to determine that at least one record in the resultant homomorphically joined tables requires further processing; and
determining that the at least one record in the resultant homomorphically joined tables contains homomorphically encrypted data.

19. The non-transitory computer readable medium of claim 18 further comprising instructions causing the apparatus to perform a homomorphically optimized addition function to add the homomorphically encrypted data values contained in the at least one record.

20. The non-transitory computer readable medium of claim 17 further comprising instructions causing the apparatus to perform aggregating results from the resultant homomorphically joined tables.

* * * * *